United States Patent
Miyake

(10) Patent No.: US 9,660,225 B2
(45) Date of Patent: May 23, 2017

(54) SECONDARY BATTERY, ELECTRONIC DEVICE, AND VEHICLE

(71) Applicant: Semiconductor Energy Laboratory Co., LTD., Atsugi-shi, Kanagawa-ken (JP)

(72) Inventor: Hiroyuki Miyake, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

(21) Appl. No.: 14/818,566

(22) Filed: Aug. 5, 2015

(65) Prior Publication Data

US 2016/0043359 A1    Feb. 11, 2016

(30) Foreign Application Priority Data

Aug. 8, 2014    (JP) .................................. 2014-162785

(51) Int. Cl.
    *H01M 2/02*    (2006.01)

(52) U.S. Cl.
CPC ......... *H01M 2/0237* (2013.01); *H01M 2/021* (2013.01); *H01M 2/0212* (2013.01); *H01M 2/0275* (2013.01); *H01M 2220/20* (2013.01); *H01M 2220/30* (2013.01)

(58) Field of Classification Search
CPC .. H01M 2/0237; H01M 2/021; H01M 2/0212; H01M 2/0275; H01M 2220/20; H01M 2220/30
See application file for complete search history.

(56) References Cited

U.S. PATENT DOCUMENTS

| | | | |
|---|---|---|---|
| 6,599,659 B1 | 7/2003 | Endo et al. | |
| 6,664,005 B2 | 12/2003 | Kezuka et al. | |
| 7,764,046 B2 | 7/2010 | Osada | |
| 7,944,172 B2 | 5/2011 | Osada | |

(Continued)

FOREIGN PATENT DOCUMENTS

| | | |
|---|---|---|
| CN | 102959760 A | 3/2013 |
| JP | 58-197655 A | 11/1983 |

(Continued)

OTHER PUBLICATIONS

International Search Report (Application No. PCT/IB2015/053509) Dated Jul. 21, 2015.

(Continued)

*Primary Examiner* — Jane Rhee
(74) *Attorney, Agent, or Firm* — Nixon Peabody LLP; Jeffrey L. Costella

(57) ABSTRACT

Provided is a secondary battery suitable for a portable information terminal or a wearable device, or an electronic device having a novel structure with a variety of forms and a secondary battery that fits the form of the electronic device. The secondary battery is sealed using a film having projections that can reduce stress on the film caused when external force is applied. The film has a pattern of projections formed by pressing (e.g., embossing). A top portion of each of the projections has a region thicker than a bottom portion of each of the projections. The thickness of the top portion of each of the projections is 1.5 or more times, preferably 2 or more times, as large as that of the bottom portion of each of the projections, and is a thickness such that each of the projections has a convex space.

20 Claims, 25 Drawing Sheets

(56) References Cited

U.S. PATENT DOCUMENTS

| | | |
|---|---|---|
| 8,192,863 B2 | 6/2012 | Best et al. |
| 8,785,030 B2 | 7/2014 | Ueda |
| 8,847,556 B2 | 9/2014 | Osada |
| 8,884,845 B2 | 11/2014 | Yamazaki et al. |
| 2005/0088365 A1 | 4/2005 | Yamazaki et al. |
| 2012/0202101 A1 | 8/2012 | Ueda |
| 2013/0101884 A1 | 4/2013 | Ueda |
| 2013/0134051 A1 | 5/2013 | Takahashi et al. |
| 2013/0177798 A1 | 7/2013 | Ueda |
| 2013/0224562 A1 | 8/2013 | Momo |
| 2013/0252088 A1 | 9/2013 | Kuriki et al. |
| 2013/0252089 A1 | 9/2013 | Kuriki |
| 2013/0273405 A1 | 10/2013 | Takahashi et al. |
| 2014/0354558 A1 | 12/2014 | Cho et al. |
| 2015/0022957 A1 | 1/2015 | Hiroki et al. |
| 2015/0111088 A1 | 4/2015 | Hiroki et al. |
| 2015/0140397 A1 | 5/2015 | Tajima et al. |
| 2015/0155528 A1 | 6/2015 | Takahashi et al. |

FOREIGN PATENT DOCUMENTS

| | | |
|---|---|---|
| JP | 59-189554 A | 10/1984 |
| JP | 07-006771 A | 1/1995 |
| JP | 2000-173559 | 6/2000 |
| JP | 2000-173559 A | 6/2000 |
| JP | 2001-052660 A | 2/2001 |
| JP | 2001-093581 A | 4/2001 |
| JP | 2001-266894 A | 9/2001 |
| JP | 2002-063938 A | 2/2002 |
| JP | 2005-157317 | 6/2005 |
| JP | 2005-157317 A | 6/2005 |
| JP | 2005-332591 A | 12/2005 |
| JP | 2006-172773 A | 6/2006 |
| JP | 2006-331874 A | 12/2006 |
| JP | 2007-066619 A | 3/2007 |
| JP | 2007-234466 A | 9/2007 |
| JP | 2009-016275 A | 1/2009 |
| JP | 2009-117255 A | 5/2009 |
| JP | 2009-533831 A | 9/2009 |
| JP | 2013-025980 A | 2/2013 |
| JP | 2013-048041 A | 3/2013 |
| JP | 2013-048042 A | 3/2013 |
| WO | WO-2007/118281 | 10/2007 |
| WO | WO-2012/001885 | 1/2012 |
| WO | WO-2012/140707 | 10/2012 |
| WO | WO-2012/140709 | 10/2012 |

OTHER PUBLICATIONS

Written Opinion (Application No. PCT/IB2015/053509) Dated Jul. 21, 2015.

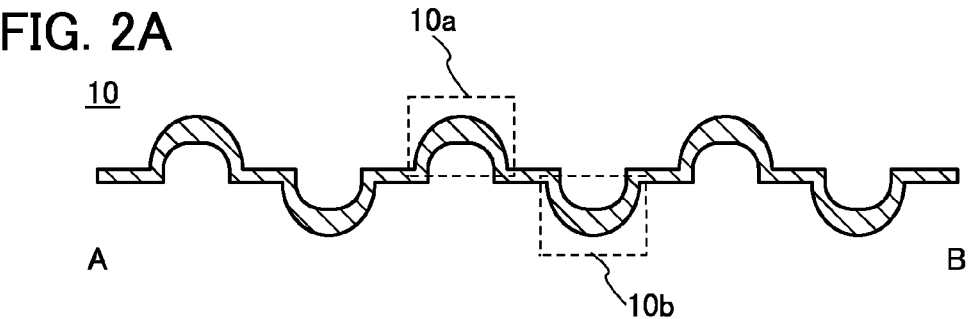
FIG. 2A
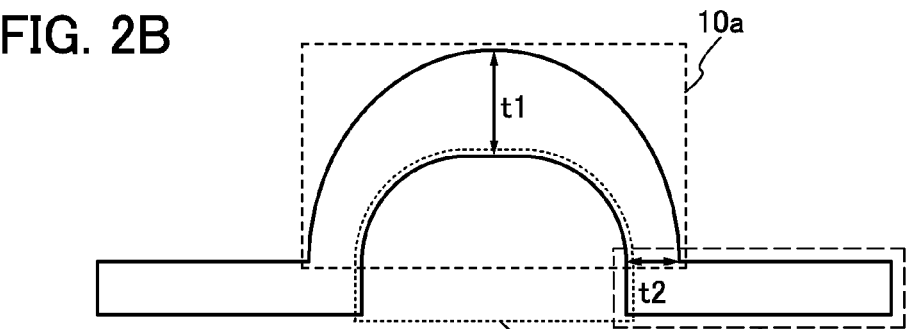
FIG. 2B
FIG. 2C
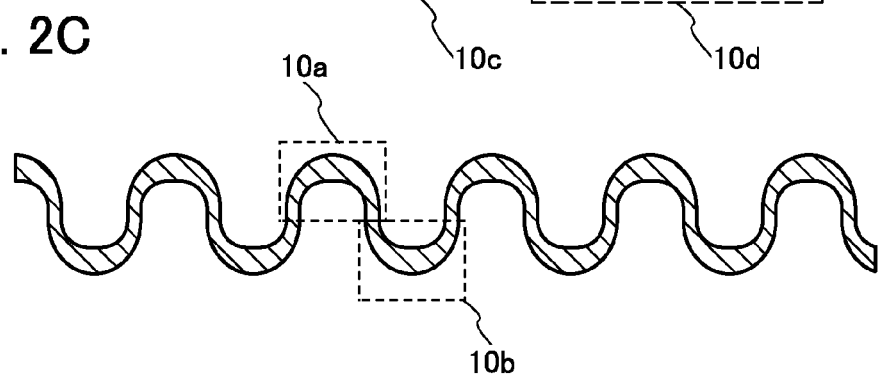
FIG. 2D
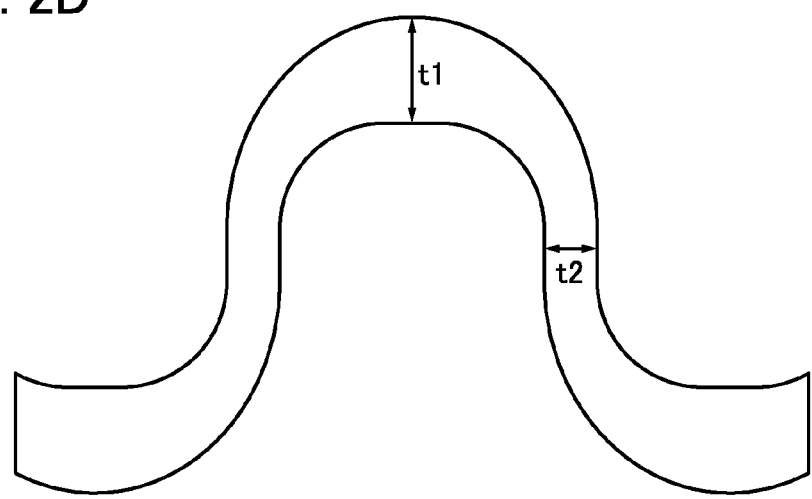

FIG. 23A  FIG. 23B  FIG. 23C
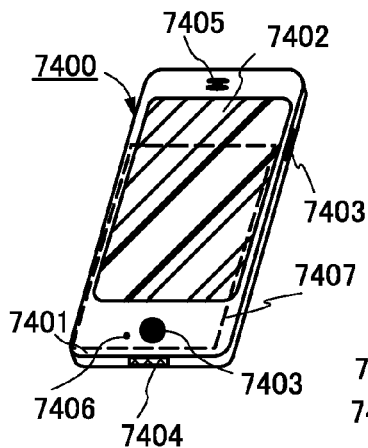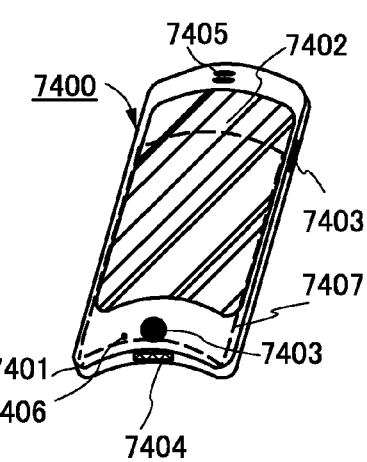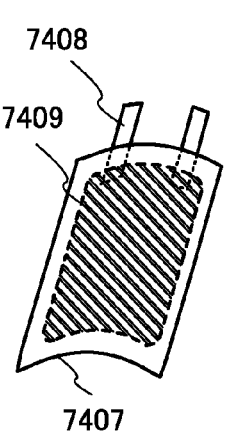
FIG. 23D  FIG. 23E  FIG. 23F
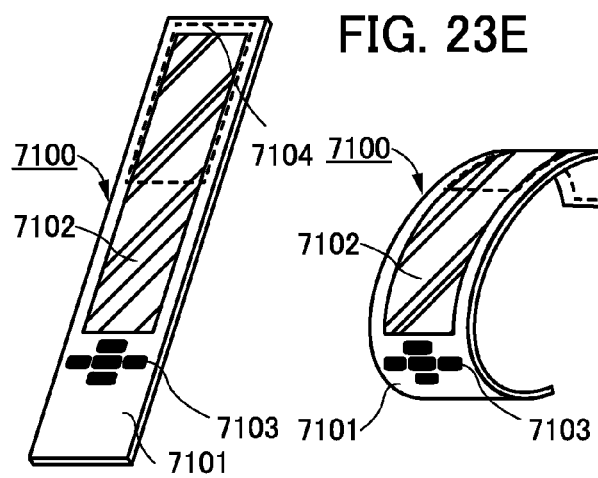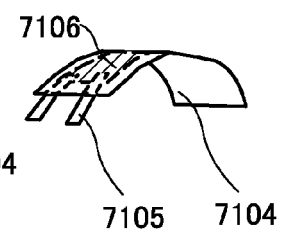
FIG. 23G  FIG. 23H
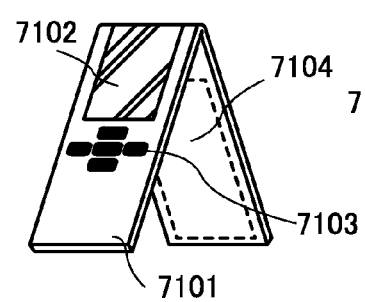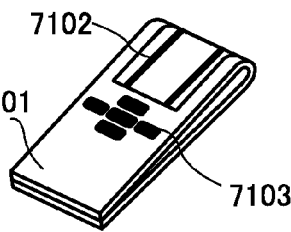

SECONDARY BATTERY, ELECTRONIC DEVICE, AND VEHICLE

BACKGROUND OF THE INVENTION

1. Field of the Invention

The present invention relates to an object, a method, or a manufacturing method. The present invention relates to a process, a machine, manufacture, or a composition of matter. One embodiment of the present invention relates to a semiconductor device, a display device, a light-emitting device, a power storage device, an imaging device, a driving method thereof, or a manufacturing method thereof. In particular, one embodiment of the present invention relates to an electronic device.

Note that electronic devices in this specification mean all devices including secondary batteries, and electro-optical devices including secondary batteries, information terminal devices including secondary batteries, vehicles including secondary batteries, and the like are all electronic devices.

2. Description of the Related Art

In recent years, portable information terminals typified by smartphones have been actively developed. Portable information terminals, which are a kind of electronic devices, are desired to be lightweight and compact for users.

Patent Document 1 discloses an example of a hands-free wearable device with which information can be visually obtained anywhere, specifically, a goggle-type display device that includes a CPU and allows data communication. The device disclosed in Patent Document 1 is also a kind of electronic device.

Most wearable devices and portable information terminals include secondary batteries that can be repeatedly charged and discharged, and have problems in that there is a limitation on the operation time because their lightweight and compactness cost the battery capacity. Secondary batteries used in wearable devices and portable information terminals should be lightweight and compact and should stand long-time use.

Examples of the secondary batteries include a nickel-metal hydride battery and a lithium-ion secondary battery. In particular, lithium-ion secondary batteries have been actively developed because the capacity thereof can be increased and the size thereof can be reduced.

Electrodes serving as positive electrodes or negative electrodes of lithium-ion secondary batteries are each formed using, for example, metallic lithium, a carbon-based material, or an alloy-based material.

REFERENCE

Patent Document

[Patent Document 1] Japanese Published Patent Application No. 2005-157317

SUMMARY OF THE INVENTION

One object is to provide a secondary battery suitable for a portable information terminal.

Another object is to provide a secondary battery suitable for a wearable device.

Another object is to provide an electronic device having a structure which can have various forms and a secondary battery that fits the form of the electronic device. Another object is to provide a novel electronic device, a novel secondary battery, or a novel power storage device.

Note that the descriptions of these objects do not preclude the existence of other objects. In one embodiment of the present invention, there is no need to achieve all the objects. Other objects will be apparent from and can be derived from the descriptions of the specification, the drawings, the claims, and the like.

In the case where an electronic device is formed to have a complicated form, a housing is designed to have a complicated form and electronic components (e.g., a power source, a wiring, a transistor, a resistor, and a capacitor) are arranged in an internal space of the housing. When it does not matter how large and heavy the electronic device is, the volume of the internal space of the housing can be made relatively large; thus, the electronic components can be arranged relatively freely.

In the case where an electronic device having a complicated form is required to be compact and lightweight, the volume of an internal space of a housing is small; thus, electronic components and the sizes thereof are selected according to the volume and the electronic components are then arranged. In this case, the manufacturing cost is increased because smaller electronic components are more expensive.

Moreover, as the volume or weight of a secondary battery increases, the capacity thereof tends to increase. Thus, there are limitations on the size and arrangement of a secondary battery that is incorporated in a small electronic device.

An increase in the mileage per charge of a vehicle using a secondary battery such as an electric vehicle and a hybrid vehicle causes an increase in the volume or weight of the secondary battery.

In view of the above, a secondary battery that can change its form is used for an electronic device and the secondary battery and other electronic components of the electronic device are arranged with efficiency in the internal space of a housing of the electronic device.

In the case where a secondary battery changes its form because of externally applying force, the external force is applied to an object such as a film used as an exterior body of the secondary battery and stress is applied to the object. This might partly deform or damage the object.

A secondary battery that can relieve a strain caused by stress is provided. A "strain" is the scale of change in form indicating the displacement of a point of an object relative to the reference (initial) length of an object. A secondary battery that can reduce the influence of a strain, that is, the scale of change in form caused by application of external force to the secondary battery, to an acceptable level is provided.

One embodiment of the invention disclosed in this specification is a secondary battery in which sealing is performed using a film provided with a plurality of projections.

Another embodiment of the invention disclosed in this specification is a secondary battery in which sealing is performed using a film having a pattern of projections.

A top portion of each of the projections has a region thicker than a bottom portion of each of the projections. The thickness of the top portion of each of the projections is 1.5 or more times, preferably 2 or more times, as large as that of the bottom portion of each of the projections, and is a thickness such that each of the projections has a convex space. In other words, the thickness of the top portion of each of the projections is 1.5 or more times, preferably 2 or more times, as large as that of the bottom portion of each of the projections, and is a thickness such that the film has projections on one surface and depressions on the other surface.

The plurality of projections may be arranged regularly or randomly.

Another embodiment of the invention disclosed in this specification is a secondary battery in which sealing is performed using a film provided with first projections and second projections.

Another embodiment of the invention disclosed in this specification is a secondary battery in which sealing is performed using a film having a pattern of first projections and second projections.

Top portions of the first projections and top portions of the second projections are on different surfaces of the film. As a typical example, the top portions of the first projections are on one surface of the film and the top portions of the second projections are on the other surface. Note that the one surface and the other surface are opposite to each other.

A top portion of each of the first projections has a region thicker than a bottom portion of each of the first projections. The thickness of the top portion of each of the first projections is 1.5 or more times, preferably 2 or more times, as large as that of the bottom portion of each of the first projections, and is a thickness such that each of the first projections has a convex space. In other words, the thickness of the top portion of each of the first projections is 1.5 or more times, preferably 2 or more times, as large as that of the bottom portion of each of the first projections, and is a thickness such that the film has projections on one surface and depressions on the other surface.

A top portion of each of the second projections has a region thicker than a bottom portion of each of the second projections. The thickness of the top portion of each of the second projections is 1.5 or more times, preferably 2 or more times, as large as that of the bottom portion of each of the second projections, and is a thickness such that each of the second projections has a convex space. In other words, the thickness of the top portion of each of the second projections is 1.5 or more times, preferably 2 or more times, as large as that of the bottom portion of each of the second projections, and is a thickness such that the film has projections on one surface and depressions on the other surface.

The first projections and the second projections may be arranged regularly. In that case, the first projections may be arranged in a first direction, the second projections may be arranged in a second direction, and the first direction and the second direction may intersect each other, or may be parallel to each other. Alternatively, the first projections and the second projections may be arranged randomly.

The plurality of projections on the film can reduce stress on the film due to application of external force.

In the above structure, the pattern of the projections is a visually recognizable geometric pattern. In the case where the pattern is a geometric pattern in which lines slanted in two directions cross each other, stress due to bending can be reduced in at least two directions. In the case where the pattern is a parallel geometric pattern, stress due to bending can be reduced in at least two directions. When the projections are arranged randomly, stress due to two-dimensional bending, stress due to three-dimensional random bending, or stress due to twisting can be reduced. The film may include a plurality of regions having different patterns. For example, the film may be provided with different patterns at the corner and at the center, providing one film with two types of patterns. Alternatively, the film may be provided with three or more types of patterns. The film may be provided with the projections only in a bendable portion and may have a flat surface in the other portion. Note that there is no particular limitation on the cross-sectional shapes of the projections.

The projections of the film can be formed by pressing (e.g., embossing). The projections formed on a surface (or on the back) of the film by embossing form an enclosed space whose inner volume is variable, which is sealed by the film serving as a part of a wall of the sealing structure. This enclosed space can be said to be formed because the film has an accordion structure or a bellows structure. The sealing structure using the film can prevent entry of water and dust. Note that embossing, which is a kind of pressing, is not necessarily employed and a method that allows formation of a relief on part of the film can be employed. A combination of methods, for example, embossing and any other pressing, may be performed on one film. Alternatively, embossing may be performed on one film more than once.

Although the secondary battery can have any of a variety of structures, a structure where a film is used as an exterior body is employed here. The film needs to have water resistance and gas resistance. Note that the film used as the exterior body is a stacked-layer film of a metal film (e.g., a foil of a metal such as aluminum, stainless steel, nickel steel, gold, silver, copper, titanium, chromium, iron, tin, tantalum, niobium, molybdenum, zirconium, or zinc, or an alloy containing any of these metals) and an insulator film. As the insulator film, a single-layer film selected from a plastic film made of an organic material, a hybrid material film containing an organic material (e.g., an organic resin or fiber) and an inorganic material (e.g., ceramic), and a carbon-containing inorganic film (e.g., a carbon film or a graphite film), or a stacked-layer film including two or more of the above films. A metal film is easy to be embossed. Forming projections by embossing increases the surface area of the metal film exposed to outside air, achieving efficient heat dissipation.

The sealing structure of the secondary battery is as follows: one rectangular film is folded in half such that two end portions overlap with each other and is sealed on three sides with an adhesive layer, or two films are stacked so as to overlap with each other and is sealed on four sides, which are edges of the film, with an adhesive layer.

The adhesive layer can be formed using a thermoplastic film material, a thermosetting adhesive, an anaerobic adhesive, a photo-curable adhesive such as a UV curable adhesive, or a reactive curable adhesive. Examples of materials of the adhesives include an epoxy resin, an acrylic resin, a silicone resin, and a phenol resin.

In forming the sealing structure by bonding and fixing the adhesive layer and the film, pressure bonding is performed. Note that the sizes of the projections are made different between an end portion of the film, which is subjected to pressure bonding, and a center portion of the film. When the projections in the end portion of the film are smaller than the projections in the center portion of the film, the influence of a strain can be reduced to be within the allowable range.

In the case where projections are provided in a center portion of a film and not in an end portion that is subjected to pressure bonding, the secondary battery can greatly expand when the volume of internal components of the secondary battery expands in the center portion. That is, explosion of the secondary battery can be prevented. In contrast, because of absence of projections in the end portion, flexibility of the end portion is lower than that in the center portion and stress is less likely to be reduced in the end portion than in the center portion. Accordingly, providing projections also in the end portion of the film helps reduce the influence of a strain to an acceptable level.

The term "electronic device having a complicated form" can be interpreted in many ways. It can be interpreted as an electronic device having a fixed complicated form (e.g., the form having a curved surface). In the case of fixing the form of the electronic device, a secondary battery is bent once and fixed while being bent. In addition, the term can also be interpreted as an electronic device having a complicated form that changes or does not change its form when external force is applied, or an electronic device having a simple form that changes its form when external force is applied. In the case of an electronic device that changes its form when force is applied, it is preferable that a secondary battery also be able to change its form every time force is applied.

Another embodiment of the invention disclosed in this specification is an electronic device including a housing partly having a curved surface and a secondary battery having a curved surface. An exterior body of the secondary battery is a film whose surface partly has a pattern formed by projections.

Another embodiment of the invention disclosed in this specification is an electronic device including a housing and a secondary battery in contact with part of the housing. An exterior body of the secondary battery is a film whose surface partly has a pattern formed by projections. The housing can partly change its form.

In the above structure, the exterior body of the secondary battery can change its form in the range of radius of curvature greater than or equal to 30 mm, and preferably greater than or equal to 10 mm and less than or equal to 150 mm. One or two films are used as the exterior body of the secondary battery. In the case where the secondary battery has a stacked-layered structure, the cross-sectional shape of the bent battery has a structure where electrodes, an electrolyte solution, and the like are sandwiched between two curves of the film in cross section.

A description is given of the radius of curvature of a surface with reference to FIGS. 21A to 21C. In FIG. 21A, on a plane 1701 along which a curved surface 1700 is cut, part of a curve 1702 of the curved surface 1700 is approximate to an arc of a circle, and the radius of the circle is referred to as a radius 1703 of curvature and the center of the circle is referred to as a center of curvature 1704. FIG. 21B is a top view of the curved surface 1700. FIG. 21C is a cross-sectional view of the curved surface 1700 taken along the plane 1701. When a curved surface is cut by a plane, the radius of curvature of a curve in a cross section differs depending on the angle between the curved surface and the plane or on the cut position. In this specification and the like, the smallest radius of curvature is defined as the radius of curvature of a surface.

In the case of bending a secondary battery in which a component 1805 including electrodes, an electrolyte solution, and the like are sandwiched between two films as exterior bodies, a radius 1802 of curvature of a film 1801 close to a center 1800 of curvature of the secondary battery is smaller than a radius 1804 of curvature of a film 1803 far from the center 1800 of curvature (FIG. 22A). When the secondary battery is curved to have an arc-shaped cross section, compressive stress is applied to a surface of the film close to the center 1800 of curvature and tensile stress is applied to a surface of the film far from the center 1800 of curvature (FIG. 22B). However, by forming a pattern of projections on surfaces of the exterior bodies, the influence of a strain can be reduced to be acceptable even when compressive stress and tensile stress are applied. For this reason, the secondary battery can change its form such that the exterior body on the side closer to the center of curvature has a curvature radius greater than or equal to 30 mm, preferably greater than or equal to 10 mm.

Note that the cross-sectional shape of the secondary battery is not limited to a simple arc shape, and the cross section can be partly arc-shaped as illustrated in FIG. 22C.

When the bent secondary battery is seen in cross section, the outer surface is stretched. In other words, the outer surface expands.

With an optimum pattern of projections formed on the film serving as the exterior body, in bending of the film, both surfaces of the film change their forms by stress; thus, the film is bent. Note that bending of a film having projections causes stress on top portions of the projections, which might form a wrinkle or a crack in the film, leading to deterioration or breakage of the secondary battery. However, when a top portion of each of the projections has a region thicker than a bottom portion of the projection, stress concentration due to bending can be reduced. As a result, the risk of deterioration or breakage of the secondary battery due to a wrinkle or a crack formed in the film when the secondary battery is bent can be reduced, and leakage of an electrolyte solution contained in the secondary battery can be prevented.

A part of an electronic device like a watch is brought into contact with a part of the body (wrist or arm) of a user, that is, the user wears the electronic device, whereby the user can feel like the electronic device is lighter than the actual weight. A flexible secondary battery can be provided in an electronic device having a form with a curved surface that fits a part of the body of a user so that the secondary battery can be fixed in a suitable form.

When a user moves a part of the body where an electronic device is on, the user might feel uncomfortable regarding the electronic device as a distraction, and feel stress even in the case where the electronic device has a curved surface that fits the part of the body. An electronic device provided with a flexible battery in a portion whose form can be changed can change its form at least partly according to movement of the body of a user; thus, an electronic device with which the user does not feel uncomfortable can be obtained.

An electronic device does not necessarily have a form with a curved surface or a complicated form; an electronic device may have a simple form. The number or size of components that can be incorporated in an electronic device with a simple form, for example, is determined depending on the volume of a space formed by a housing of the electronic device in many cases. Providing a flexible secondary battery in a small space between components other than the secondary battery enables a space formed by a housing of an electronic device to be efficiently used; thus, the electronic device can be reduced in size.

Examples of wearable devices include wearable input terminals such as a wearable camera, a wearable microphone, and a wearable sensor; wearable output terminals such as a wearable display and a wearable speaker; and wearable input/output terminals having the functions of any of the input terminals and any of the output terminals. Another example of a wearable device is a wearable computer including a CPU, which is a typical example of a device that controls each device and calculates or processes data. Other examples of wearable devices include devices that store data, send data, and receive data, typically, a portable information terminal and a memory.

A secondary battery having a novel structure can be provided. A novel power storage device can be provided.

Since the form of a secondary battery can be freely designed, when a secondary battery having a curved surface is used, for example, the design flexibility of the whole electronic device is increased and electronic devices having a variety of designs are fabricated. Furthermore, when the secondary battery is provided along the inner surface of an electronic device having a curved surface, a space in the electronic device can be effectively used with no waste.

Thus, an electronic device having a novel structure can be provided.

Note that the description of these effects does not preclude the existence of other effects. One embodiment of the present invention does not necessarily have all the effects listed above. Other effects will be apparent from and can be derived from the description of the specification, the drawings, the claims, and the like.

BRIEF DESCRIPTION OF THE DRAWINGS

FIGS. 2A to 2D are cross-sectional views each illustrating one embodiment of the present invention.

FIGS. 22A to 22C illustrate the center of curvature or the like.

FIGS. 23A to 23H illustrate electronic devices including flexible secondary batteries.

DETAILED DESCRIPTION OF THE INVENTION

Figure 1:
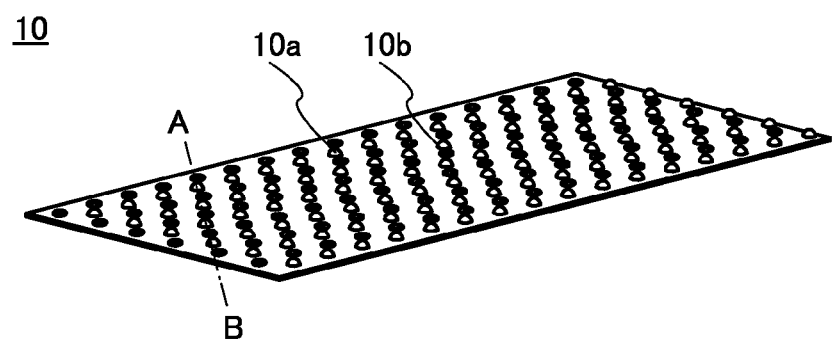
FIG. 1 is a perspective view illustrating one embodiment of the present invention.

Embodiments of the present invention will be described below in detail with reference to the drawings. However, the present invention is not limited to the descriptions below, and it is easily understood by those skilled in the art that modes and details disclosed herein can be modified in various ways. Furthermore, the present invention is not construed as being limited to the descriptions of the embodiments.

The term "electrically connected" includes the case where components are connected through an "object having any electric function." There is no particular limitation on the "object having any electric function" as long as electric signals can be transmitted and received between the components connected through the object.

The position, size, range, or the like of each component illustrated in drawings and the like is not accurately illustrated in some cases for simplification. Thus, the disclosed invention is not necessarily limited to the position, size, range, or the like disclosed in the drawings and the like.

The ordinal number such as "first", "second", and "third" are used to avoid confusion among components.

Note that the terms "film" and "layer" can be interchanged with each other depending on the case or circumstances. For example, the term "conductive layer" can be changed into the term "conductive film" in some cases. In addition, the term "insulating film" can be changed into the term "insulating layer" in some cases.

(Embodiment 1)

In this embodiment, a structure of a film that can be used as an exterior body of a secondary battery and a method for forming the film will be described. In addition, a structure of a secondary battery including the exterior body and a method for fabricating the secondary battery will be described in this embodiment.

FIG. 1 is a perspective view of a film that can be used as an exterior body of a secondary battery. A film 10 has a plurality of projections. In FIG. 1, projections 10a whose top portions are on a front surface of the film 10 and projections 10b whose top portions are on a rear surface of the film 10 are arranged regularly.

FIG. 2A is a cross-sectional view taken along dashed-dotted line A-B in FIG. 1.

As illustrated in FIG. 2A, the projections 10a whose top portions are on one surface and the projections 10b whose top portions are on the other surface are alternately arranged in the film 10.

The cross-sectional shape of each of the projections 10a and the projections 10b can be a hollow semicircular shape, a hollow semi-oval shape, a hollow polygonal shape, or a hollow irregular shape. In the case of a hollow polygonal shape, it is preferable that the polygon have more than six corners, in which case stress concentration at the corners can be reduced.

FIG. 2B is an enlarged view of one of the projections 10a. The projection 10a has a space 10c inside. Note that the space 10c exists at least inside the projection 10a. In other words, the projection 10a protrudes when seen from one surface of the film, and is recessed when seen from the other surface of the film or has a depressed portion inside on the other surface. The projection 10a may be provided between flat portions 10d. The space 10c is at least in a region surrounded by the projection 10a, and may also be in a region surrounded by side portions of the flat portions 10d and the projection 10a. In the projection 10a, the highest region is referred to as a top portion, whereas a region in contact with the flat portion 10d is referred to as a bottom portion. Furthermore, a thickness t1 of the top portion of the projection 10a is larger than a thickness t2 of the bottom portion.

Note that a structure illustrated in FIG. 2C may also be employed in which flat portions are not provided between the projections 10a whose top portions are on one surface and the projections 10b whose top portions are on the other surface. This means that in the structure, the projections 10a and the projections 10b are directly connected to each other.

FIG. 2D is an enlarged view of one of the projections 10a illustrated in FIG. 2C. In the projection 10a, the highest region is referred to as a top portion, whereas a region that is an inflection point is referred to as a bottom portion. Furthermore, a thickness t1 of the top portion of the projection 10a is larger than a thickness t2 of the bottom portion. Note that the "thickness" is the shortest distance between a pair of surfaces, that is, the distance between one surface and the other surface in a direction perpendicular to one surface and the other surface.

When outward force is applied to the film (or when tensile stress is applied to the film 10, for example), the projection expands and contracts and stress might concentrate on the top portion of the projection, leading to breakage of the projection. However, with the thickness t1 of the top portion being 1.5 or more times, preferably 2 or more times, as large as the thickness t2 of the bottom portion, stress concentration on the top portion can be reduced and breakage of the film 10 caused when the force in the external directions is applied to the film 10 can be prevented.

Note that without the space 10c in the projection 10a, the projection is less likely to expand and contract when the force in the external directions is applied to the film 10; as a result, the projection might be broken. To prevent this, the thickness t1 of the top portion is preferably a thickness such that the space 10c is formed in the projection 10a. In other words, the thickness t1 is preferably smaller than a thickness with which the space 10c is not formed in the projection 10a.

Figure 3A:
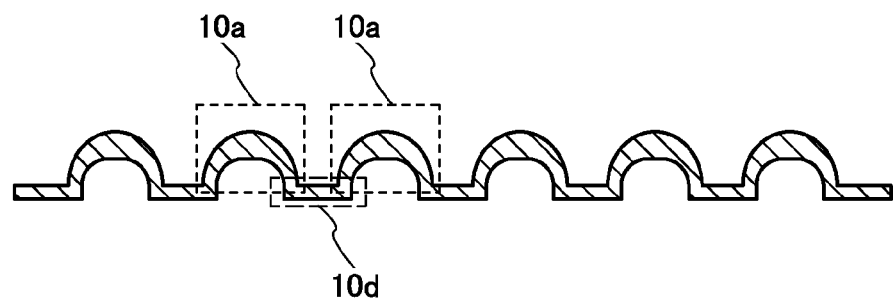
FIGS. 3A and 3B are cross-sectional views each illustrating one embodiment of the present invention.

Although the projections whose top portions are on one surface and the projections whose top portions are on the other surface are alternately arranged in FIGS. 2A and 2C, the projections 10a whose top portions are on one surface may be arranged in the film as in FIG. 3A. The film may have the flat portions 10d between the projections 10a.

Figure 3B:
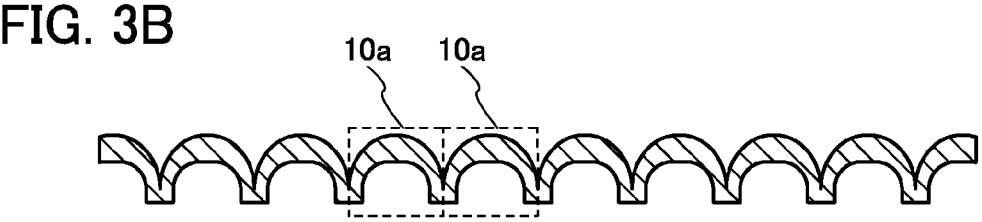

The flat portions 10d between the projections 10a are not necessarily provided, as illustrated in FIG. 3B.

Figure 4A:
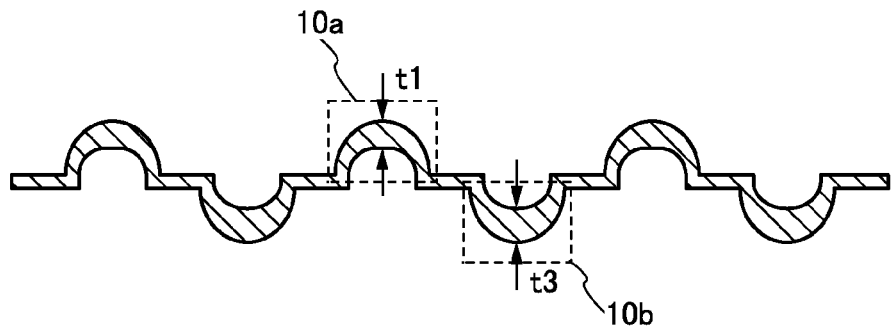
FIGS. 4A to 4E are cross-sectional views each illustrating one embodiment of the present invention.
Figure 4B:
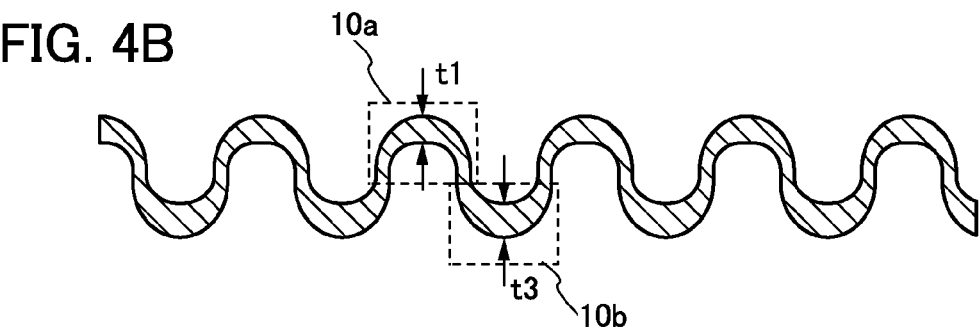
Figure 4C:
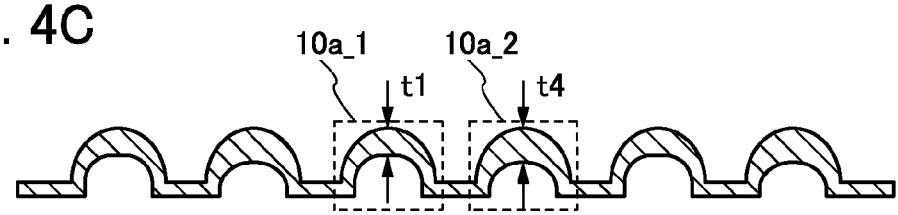
Figure 4D:
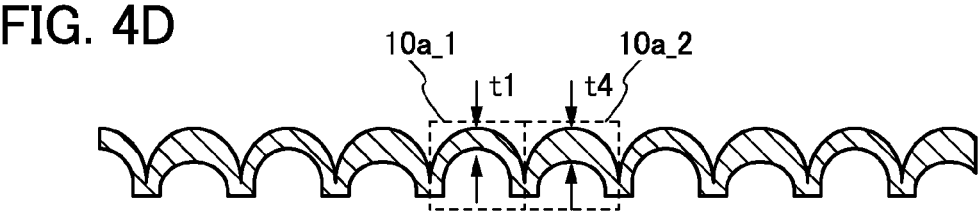

The top portions of adjacent projections may have the same thickness as in the films illustrated in FIGS. 2A to 2D and FIGS. 3A and 3B. Alternatively, the top portions of adjacent projections may have different thicknesses as in FIGS. 4A to 4D. For example, a thickness t1 of the top portion of each of the projections 10a may be different from a thickness t3 of the top portion of each of the projections 10b, as illustrated in FIGS. 4A and 4B. Alternatively, as in adjacent projections 10a_1 and 10a_2 illustrated in FIGS. 4C and 4D, a thickness t1 of a top portion of the projection 10a_1 may be different from a thickness t4 of a top portion of the projection 10a_2.

Figure 4E:
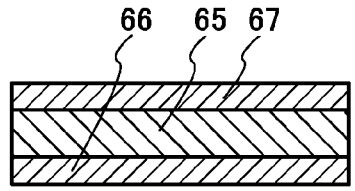

FIG. 4E is an enlarged cross-sectional view of the film. The film has a stacked-layer structure; specifically, the film includes a metal film and an insulator film that is provided on one or both surfaces of the metal film. The insulator film can be a plastic film, a hybrid material film, a carbon-containing film, or the like. Alternatively, the insulator film can be a heat-seal layer. Further alternatively, the insulator film can be an adhesive layer other than a thermosetting adhesive layer. Described here is the film in which an insulator film 66 is on one surface of a metal film 65 and an insulator film 67 is on the other surface of the metal film 65. Note that the total thickness of the film is larger in the top portion of the projection than in the bottom portion. Alternatively, the thickness of the metal film may be larger in the top portion of the projection than in the bottom portion while the entire insulator film has the same thickness in the top portion and the bottom portion of the projection.

Then, the top surface shapes of the projections will be described with reference to FIGS. 5A to 5D and FIGS. 6A and 6B.

Figure 5A:
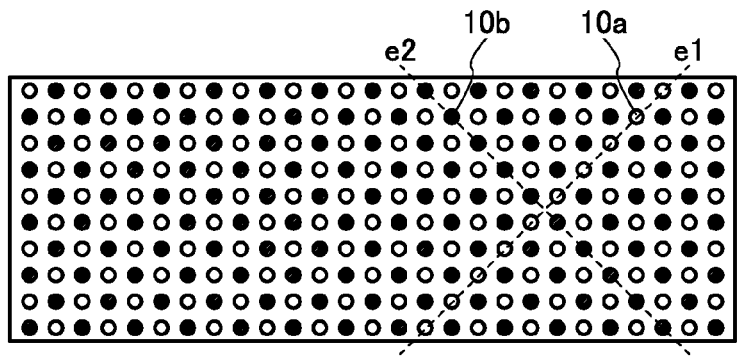
FIGS. 5A to 5D are top views each illustrating one embodiment of the present invention.

In a film illustrated in FIG. 5A, the projections 10a whose top portions are on one surface and the projections 10b whose top portions are on the other surface are arranged regularly. Here, a dashed line e1 indicating a direction in which the projections 10a are arranged and a dashed line e2 indicating a direction in which the projections 10b are arranged are slanted to the sides of the film. In addition, the dashed line e1 and the dashed line e2 cross each other.

Figure 5B:
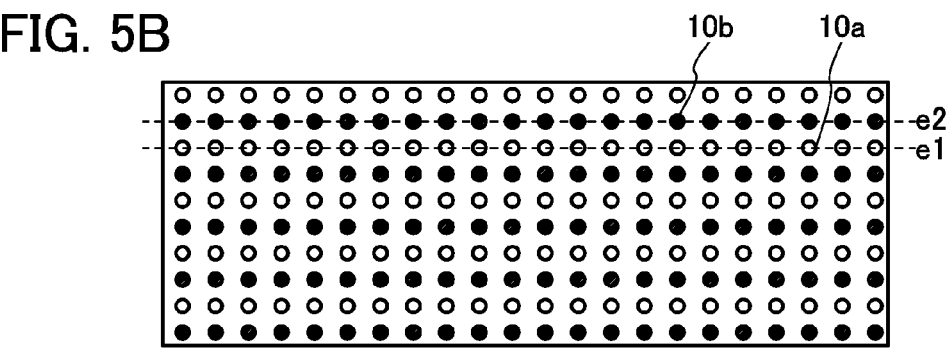

In a film illustrated in FIG. 5B, the projections 10a whose top portions are on one surface and the projections 10b whose top portions are on the other surface are arranged regularly. Here, a dashed line e1 indicating a direction in which the projections 10a are arranged and a dashed line e2 indicating a direction in which the projections 10b are arranged are parallel to the long side of the film.

Figure 5C:
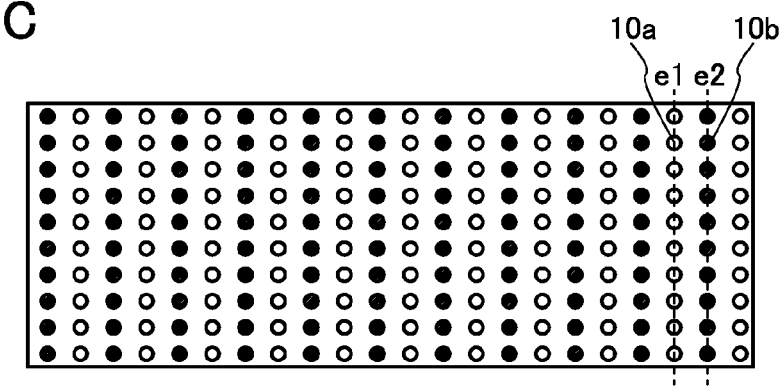

In a film illustrated in FIG. 5C, the projections 10a whose top portions are on one surface and the projections 10b whose top portions are on the other surface are arranged regularly. Here, a dashed line e1 indicating a direction in which the projections 10a are arranged and a dashed line e2 indicating a direction in which the projections 10b are arranged are parallel to the short side of the film.

Figure 5D:
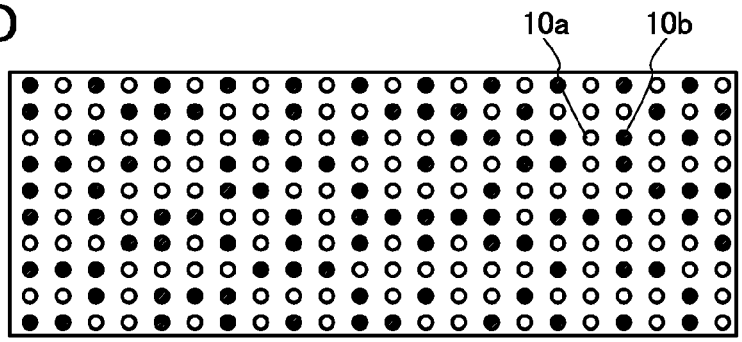

In a film illustrated in FIG. 5D, the projections 10a whose top portions are on one surface and the projections 10b whose top portions are on the other surface are arranged randomly.

Although the top surface shape of each of the projections illustrated in FIGS. 5A to 5D is a circle, the top surface shape may be a polygon or an irregular shape.

The projections 10a whose top portions are on one surface and the projections 10b whose top portions are on the other surface may have the same top surface shape as in the films illustrated in FIGS. 5A to 5D. Alternatively, the projections 10a whose top portions are on one surface and the projections 10b whose top portions are on the other surface may have different top surface shapes as illustrated in FIG. 6A.

Figure 6A:
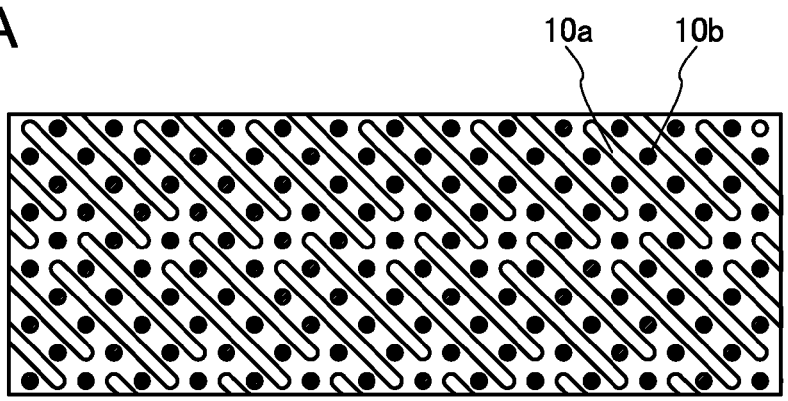
FIGS. 6A and 6B are top views each illustrating one embodiment of the present invention.

In a film illustrated in FIG. 6A, the projections 10a have linear top surface shapes, and the projections 10b have model for calculation of stress on a film and the calculation results circular top surface shapes. Note that each of the top surface shapes of the projection 10a may be a straight-line shape, a curve shape, a wave shape, a zigzag shape, or an irregular shape, and each of the top surface shapes of the projection 10b may be a polygon or an irregular shape.

Figure 6B:
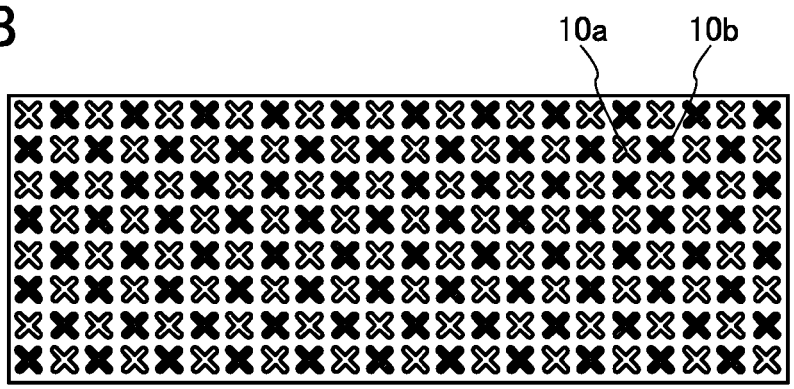

Alternatively, the top surface shapes of the projections 10a and 10b may be cross shapes as illustrated in FIG. 6B.

The top surface shapes as in FIGS. 5A to 5D and FIGS. 6A and 6B can reduce stress due to bending in at least two directions.

Next, verification results of stress applied to a film, obtained by calculation using a model, will be described. For the calculation, finite element method analysis software, ANSYS Mechanical APDL (manufactured by ANSYS Inc.) was used.

Figure 7:
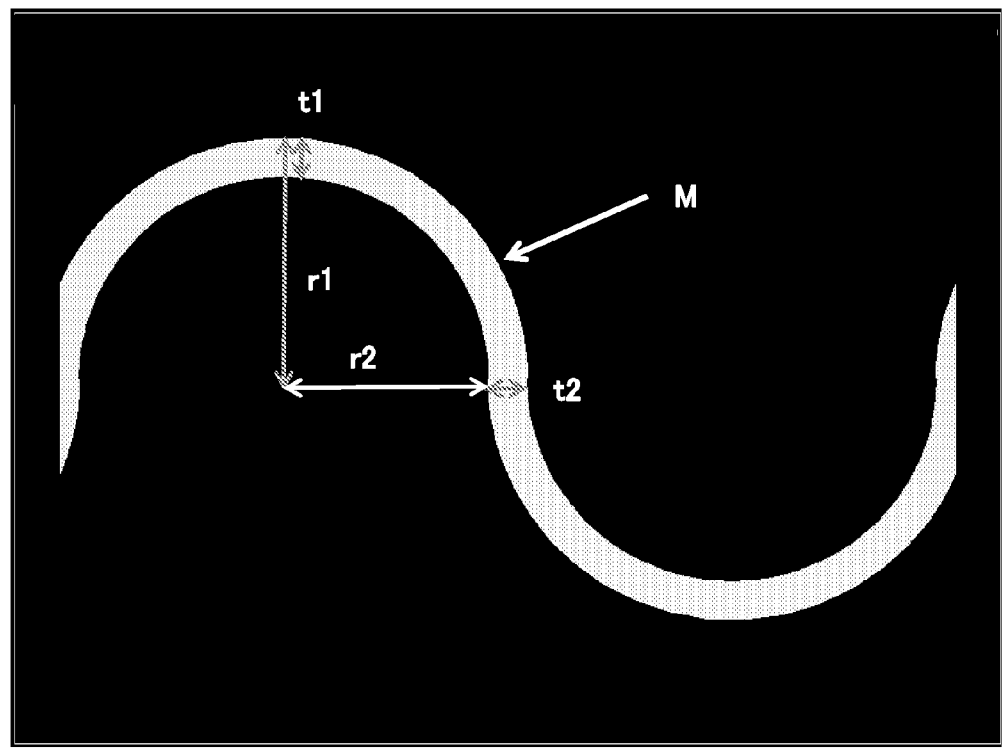
FIG. 7 shows a model for calculation of stress on a film.

FIG. 7 is a cross-sectional view of a film M used as a calculation model. In each of projections of the film M, the thickness of a top portion is represented by "t1" and the thickness of a bottom portion is represented by "t2". The projection has a shape obtained by excluding a semi-ellipse with a short-axis radius of (r1−t1) and a long-axis radius of r2 from a semicircle with an outside diameter of r1. Furthermore, a projection whose top portion protrudes up and a projection whose top portion protrudes down are combined. Note that aluminum was used as a material of the film M, the Young's modulus (E) was $7.03 \times 10^{10}$ Pa, and the Poisson's ratio (ν) was 0.345. An element type of 183 was used. In addition, rightward force of 1000 Pa was applied to a right edge of the film M.

For a calculation model 1, r1 and r2 were set to 250 μm and 210 μm, respectively, and a partitioned number was set to 10. Then, the thickness t2 of the bottom portion was fixed to 40 μm and the thickness t1 of the top portion was changed in order to calculate stress on the film M when rightward force was applied to the right edge of the film M.

Figure 8:
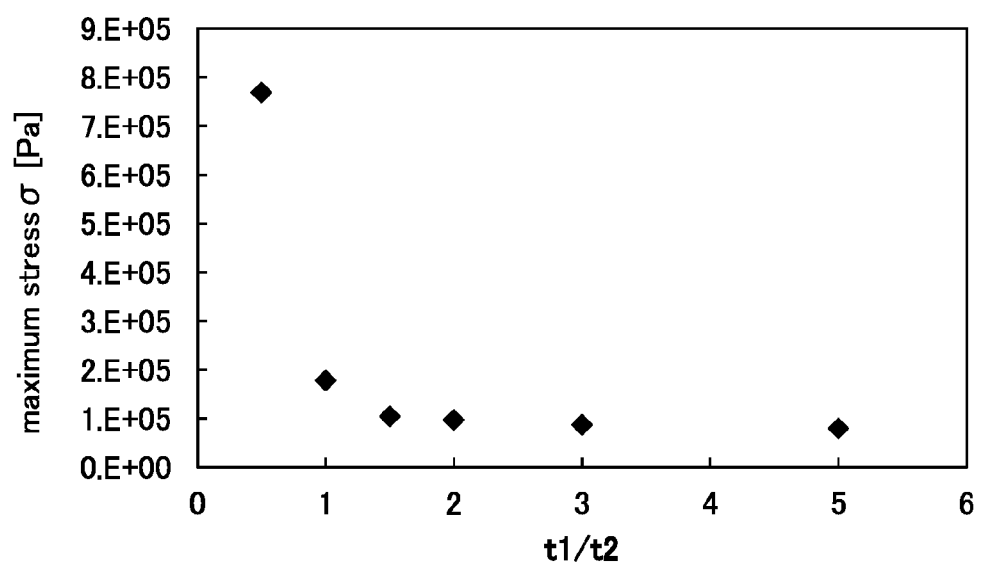
FIG. 8 shows calculation results of stress on a film.

FIG. 8 shows the relationship between t1/t2 and the maximum stress σ on the top portion of the projection obtained by the calculation. In FIG. 8, the maximum stress σ reduces as t1/t2 increases. Furthermore, the maximum stress is almost constant with t1/t2 greater than or equal to 1.5.

Figure 9:
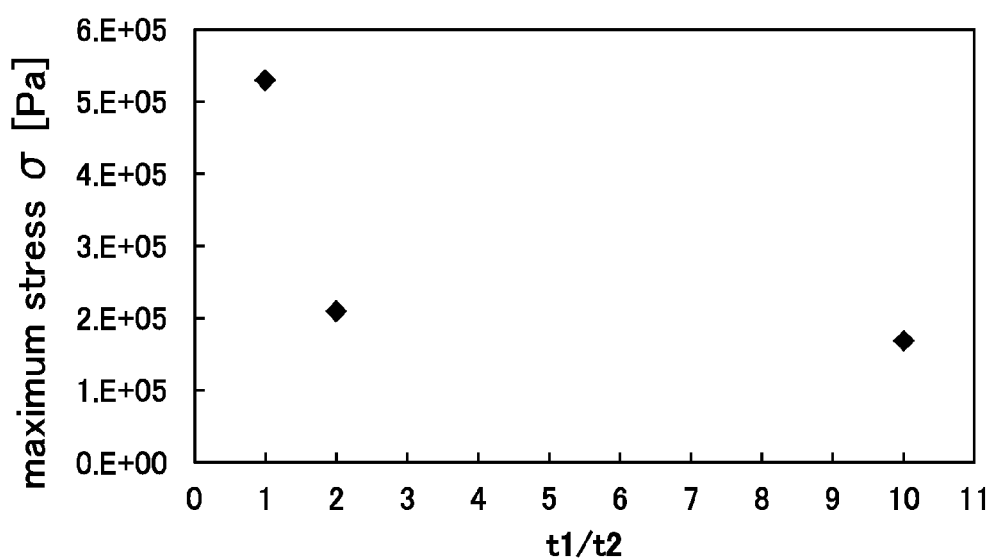
FIG. 9 shows calculation results of stress on a film.

Next, calculation was conducted in a similar manner under the condition where t1/t2 is greater than 5. For a calculation model 2, r1, r2, and the thickness t2 of the bottom portion were set to 500 μm, 460 μm, and 40 μm, respectively, and a partitioned number was set to 20 to calculate stress on the film. FIG. 9 shows the calculation results. The results show that the maximum stress σ with t1/t2 of 10 is almost the same as that with t1/t2 of 2.

This means that when the thickness of the top portion of the projection is larger than the thickness of the bottom portion, stress concentration on the top portion can be reduced.

The stress is reduced when the area is increased. For this reason, stress on the film M was calculated while the cross-sectional area was fixed and the ratio of the thickness of the top portion of the projection to that of the bottom portion was changed.

Figure 10A:
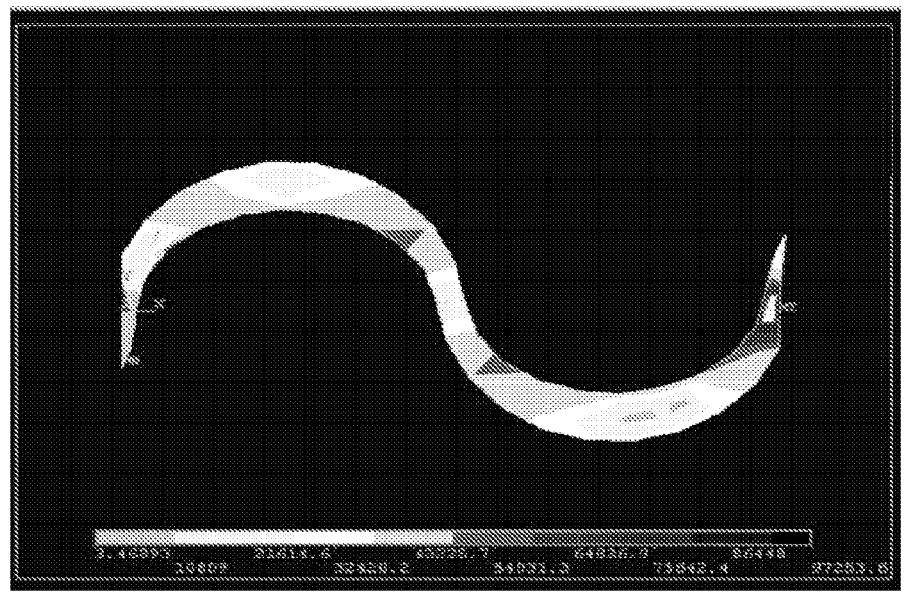
FIGS. 10A and 10B each show calculation results of stress on a film.

Here, a film shown in FIG. 10A having a cross-sectional area of $4.2 \times 10^4$ μm² was used as a calculation model 3, and t1/t2 and a partitioned number were set to 2 and 10, respectively, to calculate stress on the film. In addition, a film shown in FIG. 10B having a cross-sectional area of $4.2 \times 10^4$ μm² was used as a calculation model 4, and t1/t2 and a partitioned number were set to 1 and 10, respectively, to calculate stress the film.

Figure 10B:
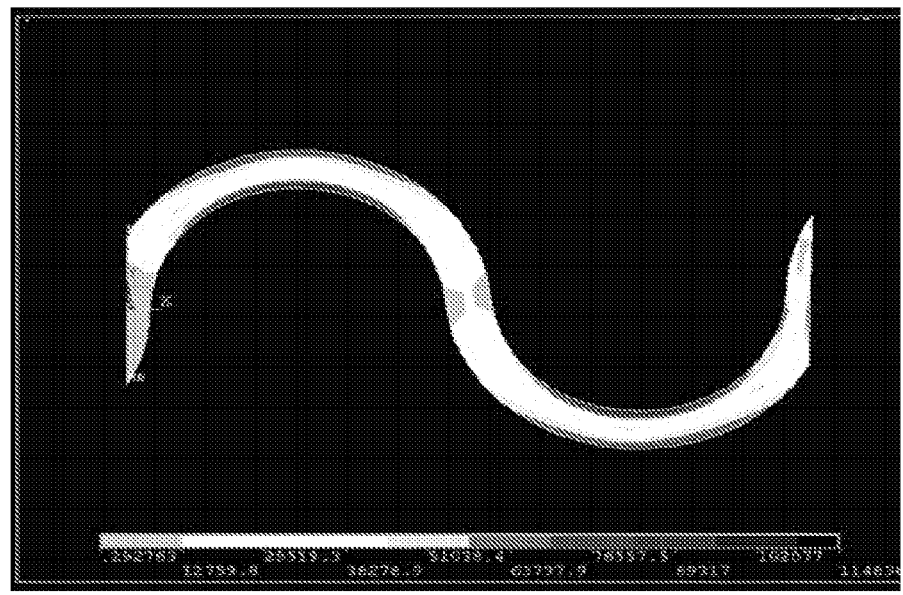

FIG. 10A shows the calculation results of the calculation model 3, and FIG. 10B shows the calculation results of the calculation model 4. A color bar represents the magnitude of the stress; color on the right-hand side represents large stress.

The results in FIG. 10B show that large stress is applied to a top portion of a projection and specifically to an outer side portion and an inner side portion of the top portion. In contrast, stress is not concentrated on a top portion of a projection in FIG. 10A. Note that in FIG. 10A, stress is concentrated on a right edge portion of the film to which the force is applied.

The above results show that when the thickness of the top portion of the projection is larger than that of the bottom portion, stress concentration on the top portion can be reduced.

Next, stress on the film M was calculated by changing the thicknesses of top portions of a projection whose top portion is on one surface and a projection whose top portion is on the other surface.

Figure 11A:
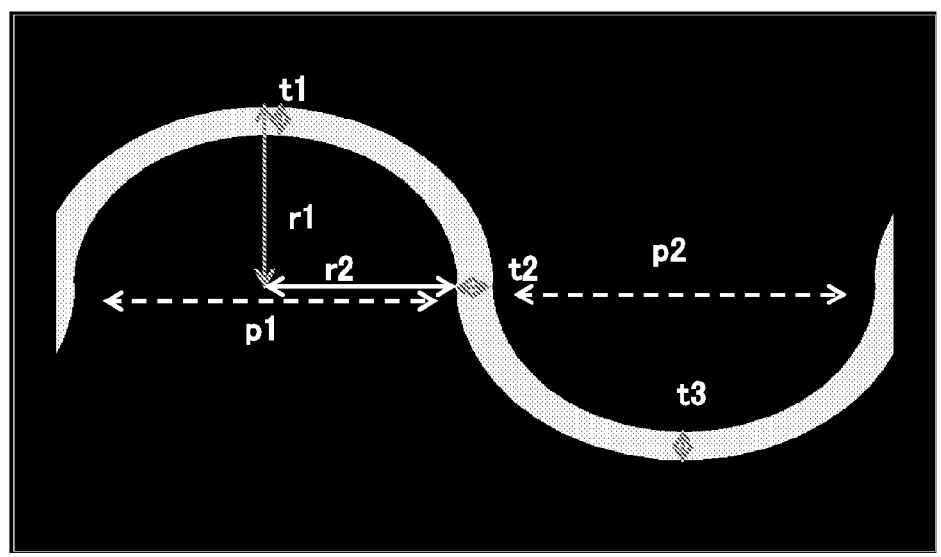
FIGS. 11A and 11B show a model for calculation of stress on a film and the calculation results.

As illustrated in FIG. 11A, the thickness of a top portion of a projection p1, the thickness of a bottom portion of projections p1 and p2, and the thickness of a top portion of the projection p2 in a calculation model 5 are represented by "t1", "t2", and "t3", respectively. Here, t1, t2, t3, and a partitioned number were set to 80 μm, 40 μm, 120 μm, and 10, respectively, to calculate stress on the film.

Figure 11B:
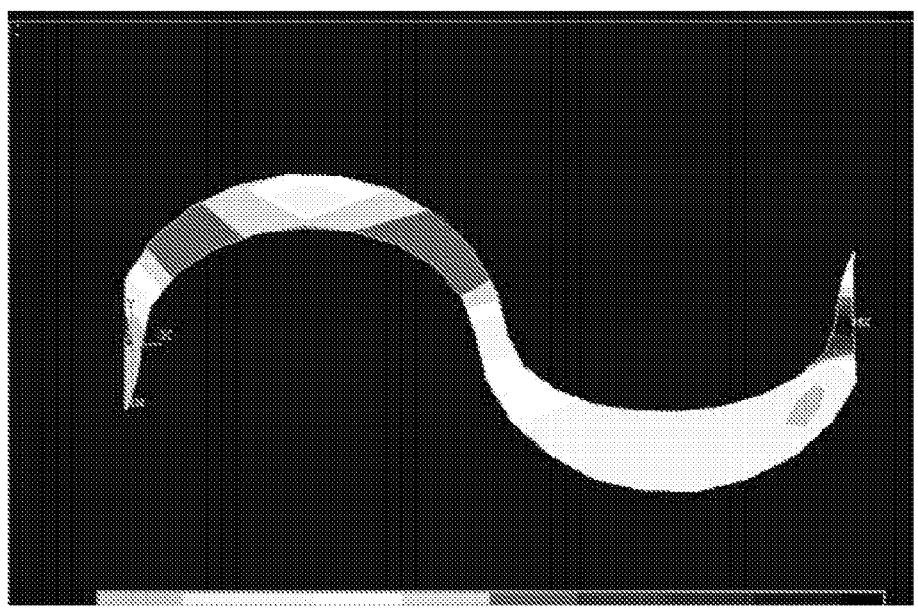

FIG. 11B shows calculation results of the calculation model 5. A color bar represents the magnitude of the stress; color on the right-hand side represents large stress. Stress is not concentrated on the top portions of the projections p1 and p2. This indicates that stress concentration on top portions of projections can be reduced even when top portions of adjacent projections have different thicknesses.

The above calculation results indicate that making the thickness of a top portion of a projection included in a film larger than that of a bottom portion is very effective for reducing local concentration of stress on the projection.

Next, a method for forming the film described in this embodiment will be described with reference to FIGS. 12A and 12B, FIG. 13, and FIGS. 14A to 14C.

Figure 12A:
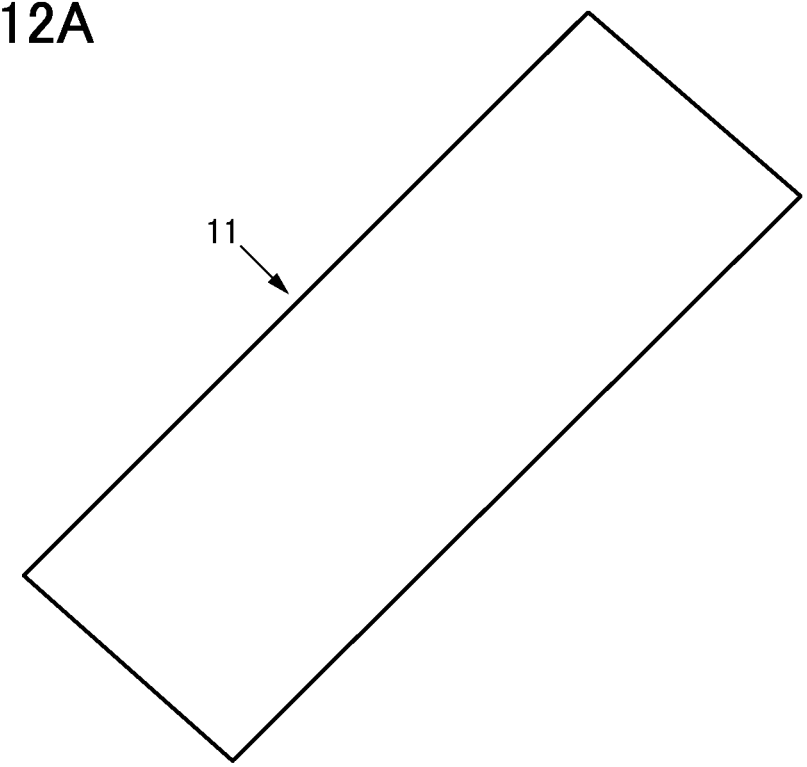
FIGS. 12A and 12B are perspective views each illustrating one embodiment of the present invention.

Here, a method for forming projections on a film by embossing will be described with reference to FIGS. 12A and 12B and FIG. 13.

First, a sheet made of a flexible material is prepared. As the sheet, a stacked body, a metal film provided with a heat-seal layer or sandwiched between adhesive layers is used. As the adhesive layer, a heat-seal resin film containing, e.g., polypropylene or polyethylene is used. In this embodiment, a metal sheet, specifically, aluminum foil whose top surface is provided with a nylon resin and whose bottom surface is provided with a stack including an acid-resistant polypropylene film and a polypropylene film is used as the sheet. This sheet is cut to obtain a film 11 illustrated in FIG. 12A.

Then, the film 11 is embossed. As a result, the film 10 illustrated in FIG. 12B can be obtained. As illustrated in FIG. 12B, the film 10 has a plurality of projections that form a visually recognizable pattern. Note that in FIG. 12B and FIGS. 16A and 16D, an intersection of oblique lines is regarded as a region where a projection is formed for easy understanding. Although an example where the sheet is cut and then is embossed is described here, there is no particular limitation on the order; embossing may be performed before cutting the sheet and then the sheet is cut so as to be in the state illustrated in FIG. 12B. Alternatively, the sheet may be cut after thermocompression bonding is performed with the sheet bent.

Embossing, which is a kind of pressing, will be described.

Figure 13:
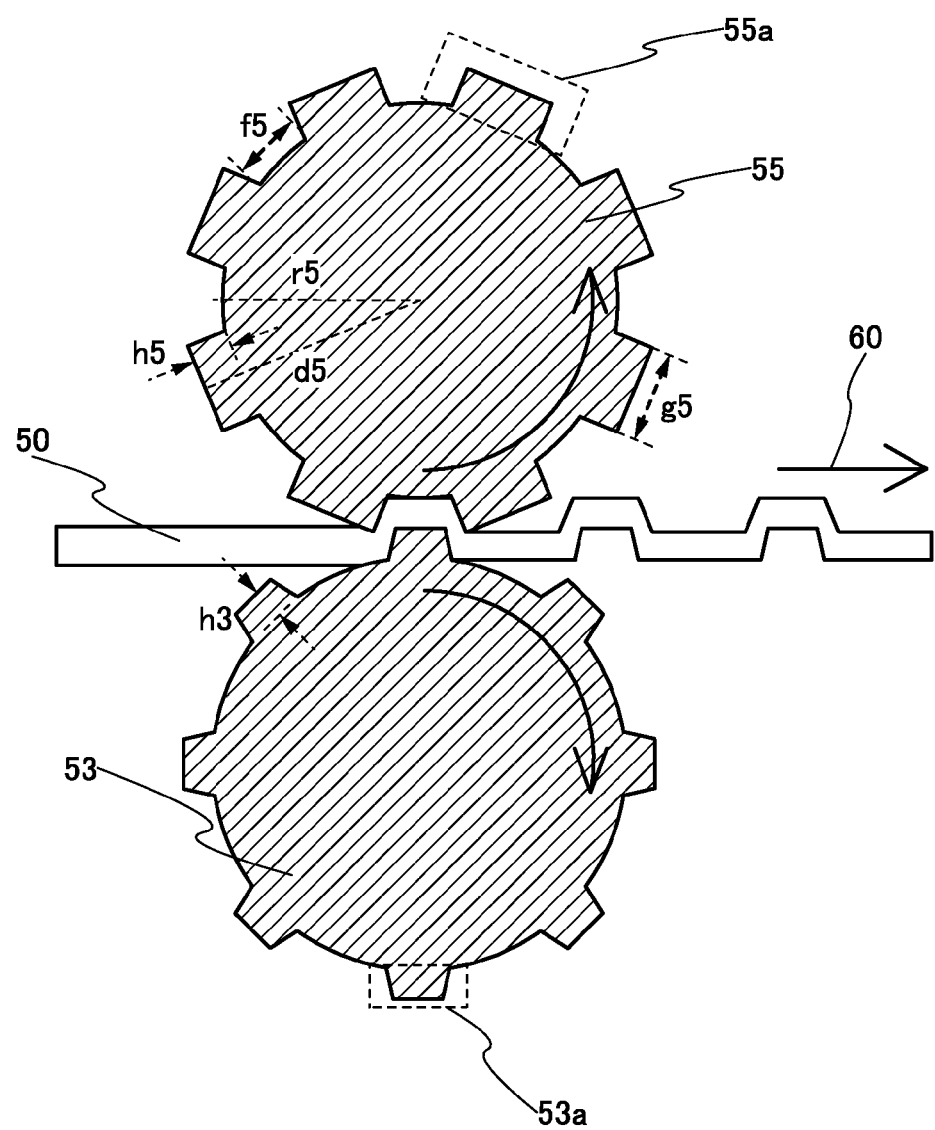
FIG. 13 is a cross-sectional view illustrating a method for forming one embodiment of the present invention.

FIG. 13 is a cross-sectional view showing an example of embossing. Note that embossing refers to processing for forming projections and depressions on a film by bringing an embossing roll whose surface has projections and depressions into contact with the film with pressure. The embossing roll is a roll whose surface is patterned.

FIG. 13 illustrates an example where both surfaces of a film are embossed, and shows a method for forming a film having projections whose top portions are on one surface.

FIG. 13 illustrates the state where a film 50 is sandwiched between an embossing roll 53 in contact with the one surface of the film and an embossing roll 55 in contact with the other surface and the film 50 is being transferred in a direction 60.

The surface of the film is patterned by pressure or heat. The surface of the film may be patterned by pressure and heat.

The embossing rolls can be formed of metal rolls, ceramic rolls, plastic rolls, rubber rolls, an organic resin rolls, lumber rolls, or the like, as appropriate.

In FIG. 13, embossing is performed using the male embossing roll 53 and the female embossing roll 55. The male embossing roll 53 has a plurality of projections 53a. The projections correspond to projections formed on a film to be processed. The female embossing roll 55 has a plurality of projections 55a. Between adjacent projections 55a, a depression is positioned into which a projection formed on the film by the projection 53a of the male embossing roll 53 fits.

Successive embossing by which the film 50 partly stands out and debossing by which the film 50 is partly indented can form a projection and a flat portion successively. In this manner, a pattern can be formed on the film 50.

It is preferable that a height h3 of each of the projections 53a of the male embossing roll 53 be smaller than a height h5 of each of the projections 55a of the female embossing roll 55. It is also preferable that the width of each of the projections 53a of the male embossing roll 53 be smaller than the width of a depression between adjacent projections 55a of the female embossing roll 55. Accordingly, in a projection formed on a sheet, a top portion can have a region thicker than a bottom portion.

Note that the height of a projection of an embossing roll corresponds to the difference between the distance between the center and the surface of a top portion of the embossing roll in a region with a protrusion and the radius of the embossing roll. For example, the height h5 of the projection of the embossing roll 55 corresponds to the difference between a distance d5 between the center and the surface of the top portion of the projection 55a and a radius r5 of the embossing roll 55 (d5−r5).

Furthermore, the width of a projection of an embossing roll is the shortest length in the projection. For example, in the embossing roll 55, the shortest length g5 in the width of the projection 55a is referred to as the width of the projection 55a.

Moreover, the width of a depression between adjacent projections of an embossing roll is the shortest distance between side surfaces of the adjacent projections. For example, in the embossing roll 55, the shortest distance f5 between side surfaces of adjacent projections 55a is referred to as the width of the depression.

Figure 14A:
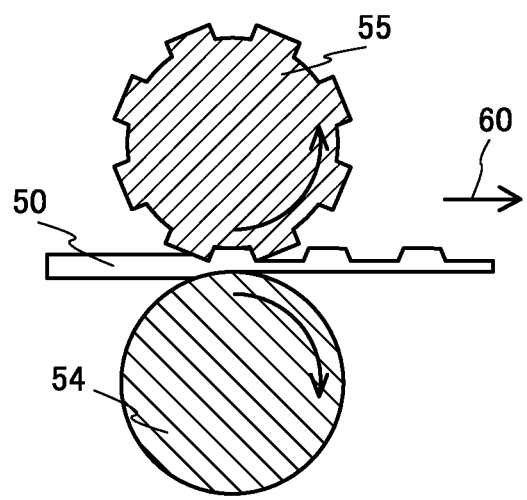
FIGS. 14A to 14C are cross-sectional views illustrating a method for forming one embodiment of the present invention.
Figure 14B:
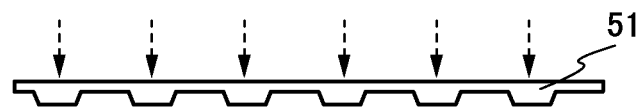
Figure 14C:

Next, a method for forming a film having a plurality of projections, which is a method different from that described with reference to FIG. 13, will be described with reference to FIGS. 14A to 14C. FIGS. 14A to 14C illustrate an example where one surface of a film is embossed, and show a method for forming a film having projections whose top portions are on one surface.

FIG. 14A illustrates the state where the film 50 sandwiched between the embossing roll 55 in contact with one surface of the film and a roll 54 in contact with the other surface and the film 50 is being transferred in the direction 60. Note that the roll 54 may be fixed without rotating. Since the embossing roll 55 is provided only on one surface of the film here, a plurality of projections formed on the film have no space. This means that the film has protrusions on one surface and is flat on the other surface.

Then, as illustrated in FIG. 14B, a film 51 in which projections are formed on one surface by embossing is partly removed. Here, the film is partly removed from a flat surface, that is, the surface that was in contact with the roll 54, of the projections. As a method for removing part of the film, thermal removal by laser irradiation, chemical removal by dropping an etchant, physical removal using a tool, or the like can be given.

As a result, the spaces 10c can be formed in the projections 10a as illustrated in FIG. 14C. In this manner, a film 52 having the projections 10a can be formed.

Note that in the method of forming a film illustrated in FIGS. 14A to 14C, a metal film is preferably used as the film 50. In addition, a heat-seal layer is preferably provided on one or both surfaces of the metal film after the process illustrated in FIGS. 14A to 14C.

Next, a method for forming a film having a plurality of projections, which is a method different from those described with reference to FIG. 13 and FIGS. 14A to 14C, will be described with reference to FIGS. 15A to 15D. FIGS. 15A to 15D illustrate an example where both surfaces of a film are embossed using embossing plates, and show a method for forming a film having projections whose top portions are on one surface and projections whose top portions are on the other surface.

Figure 15A:
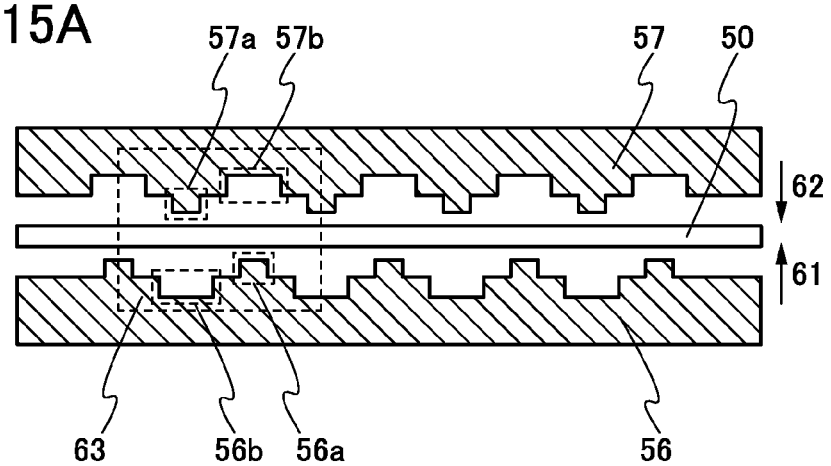
FIGS. 15A to 15D are cross-sectional views illustrating a method for forming one embodiment of the present invention.
Figure 15B:
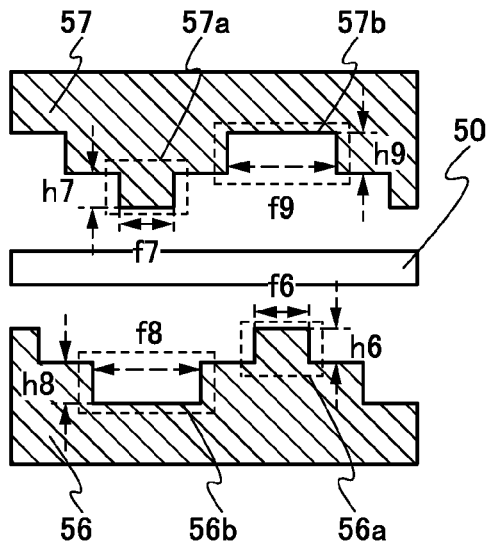

As illustrated in FIG. 15A, an embossing plate 56 having projections 56a and depressions 56b, and an embossing plate 57 having projections 57a and depressions 57b are prepared.

Then, the film 50 is positioned between the embossing plates 56 and 57.

Figure 15C:
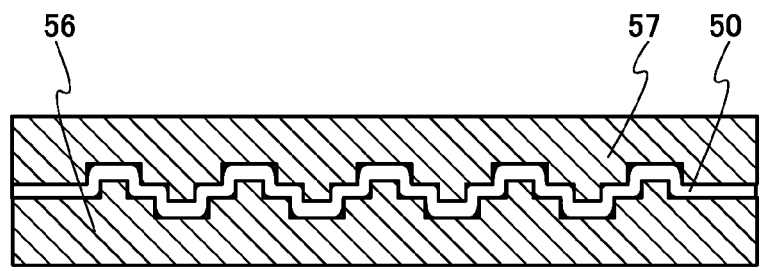

After that, the embossing plate 56 is pressed in a direction of an arrow 61 shown in FIG. 15A or against one surface of the film 50, and the embossing plate 57 is pressed in a direction of an arrow 62 shown in FIG. 15A or against the other surface of the film 50 (see FIG. 15C). It is preferable that the positions of the embossing plates 56 and 57 be adjusted at this time so that the projections 56a of the embossing plate 56 fit the depressions 57b of the embossing plate 57 and the projections 57a of the embossing plate 57 fit the depressions 56b of the embossing plate 56.

Here, a height h6 of each of the projections 56a of the embossing plate 56 is preferably smaller than a depth h9 of each of the depressions 57b of the embossing plate 57. Furthermore, a width f6 of each of the projections 56a of the embossing plate 56 is preferably smaller than a width f9 of each of the depressions 57b of the embossing plate 57 (see FIG. 15B).

In addition, a height h7 of each of the projections 57a of the embossing plate 57 is preferably smaller than a depth h8 of each of the depressions 56b of the embossing plate 56. Furthermore, a width f7 each of the projections 57a of the embossing plate 57 is preferably smaller than a width f8 of each of the depressions 56b of the embossing plate 56 (see FIG. 15B).

Figure 15D:
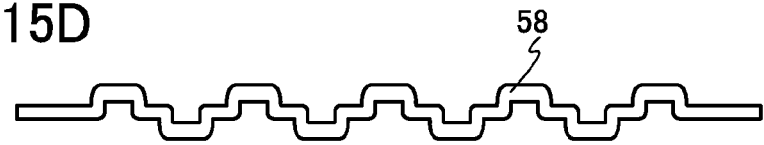

As a result, a film 58 having projections whose top portions are on one surface and projections whose top portions are on the other surface can be formed as illustrated in FIG. 15D. Furthermore, in each of the projections, a top portion can have a region thicker than a bottom portion.

Note that an embossing roll or an embossing plate is not necessarily used, and a relief may be formed on part of a film.

Next, a method for fabricating a secondary battery will be described. In the method described in this embodiment, the film 10 having projections is folded in half so that two end portions overlap with each other, and three sides are sealed using an adhesive layer.

Figure 12B:
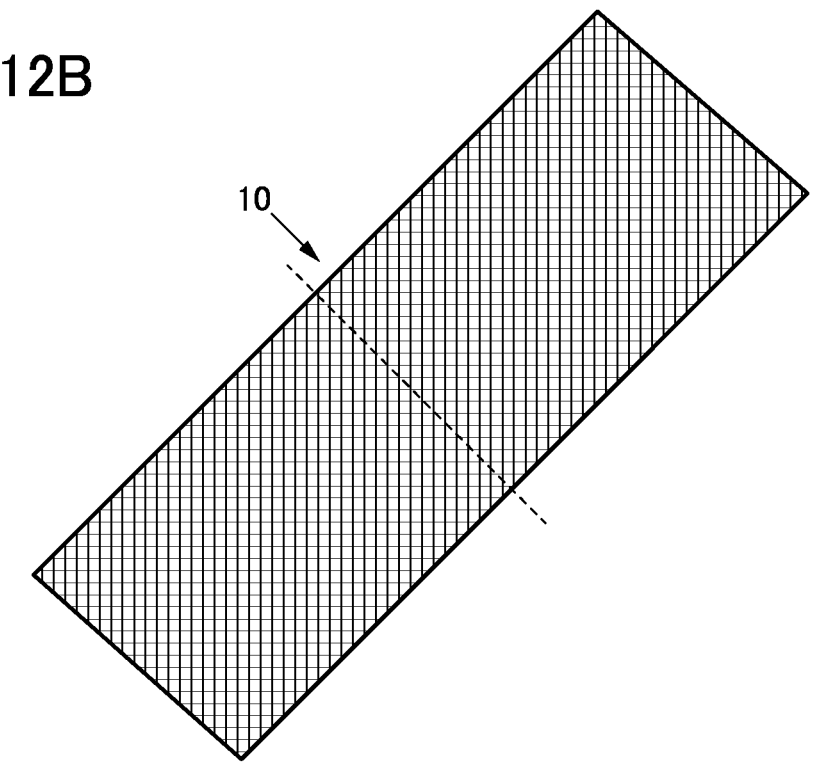
Figure 16A:
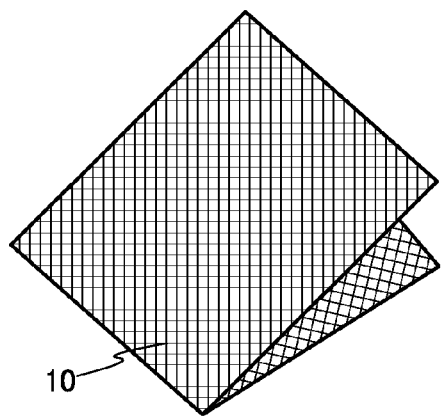
FIGS. 16A to 16E are perspective views and a cross-sectional view illustrating one embodiment of the present invention.

The film 10 is folded along a dotted line shown in FIG. 12B so as to be in the state illustrated in FIG. 16A.

Figure 16B:
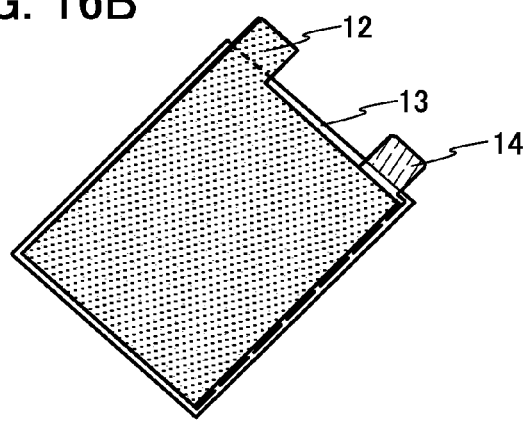

Then, as illustrated in FIG. 16B, a stack including a positive electrode current collector 12, a separator 13, and a negative electrode current collector 14 included in a secondary battery is prepared. Although not illustrated in the drawings, a positive electrode active material layer is formed on part of a surface of the positive electrode current collector 12, whereas a negative electrode active material layer is formed on part of a surface of the negative electrode current collector 14. The positive electrode current collector 12 and the negative electrode current collector 14 can each be formed using a highly conductive material that is not alloyed with a carrier ion such as a lithium ion, for example, a metal such as stainless steel, gold, platinum, zinc, iron, nickel, copper, aluminum, titanium, and tantalum or an alloy thereof. Alternatively, an aluminum alloy to which an element which improves heat resistance, such as silicon, titanium, neodymium, scandium, and molybdenum, is added can be used. Further alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collectors can each have a foil-like shape, a plate-like shape (sheet-like shape), a net-like shape, a cylindrical shape, a coil shape, a punching-metal shape, an expanded-metal shape, or the like as appropriate. The current collectors each preferably have a thickness of 5 µm to 40 µm inclusive. Note that in the example illustrated here, for simplicity, one stack including the positive electrode current collector 12 provided with the positive electrode active material layer, the separator 13, and the negative electrode current collector 14 provided with the negative electrode active material layer is packed in an exterior body. To increase the capacity of a secondary battery, a plurality of the stacks are stacked and packed in an exterior body.

Figure 16C:
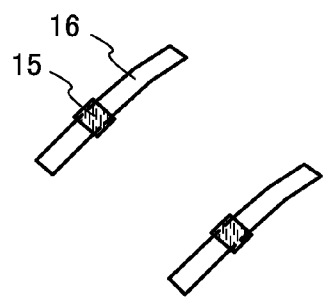

In addition, two lead electrodes 16 with sealing layers 15 illustrated in FIG. 16C are prepared. Each of the lead electrodes 16 is also referred to as a lead terminal and is provided in order to lead a positive electrode or a negative electrode of a secondary battery to the outside of an exterior film. Aluminum and nickel-plated copper are used for the positive electrode lead and the negative electrode lead, respectively.

Then, the positive electrode lead is electrically connected to a protruding portion of the positive electrode current collector 12 by ultrasonic welding or the like, and the negative electrode lead is electrically connected to a protruding portion of the negative electrode current collector 14 by ultrasonic welding or the like.

Next, two sides of the film 10 are sealed by thermocompression bonding, and one side is left open for introduction of an electrolyte solution. In thermocompression bonding, the sealing layers 15 provided on the lead electrodes are also melted, thereby fixing the lead electrodes and the film 10 to each other. After that, in reduced pressure or an inert gas atmosphere, a desired amount of electrolyte solution is dropped into the film 10 in the form of a bag. Lastly, an end portion of the film that has not been subjected to thermocompression bonding and is left open is sealed by thermocompression bonding.

Figure 16D:
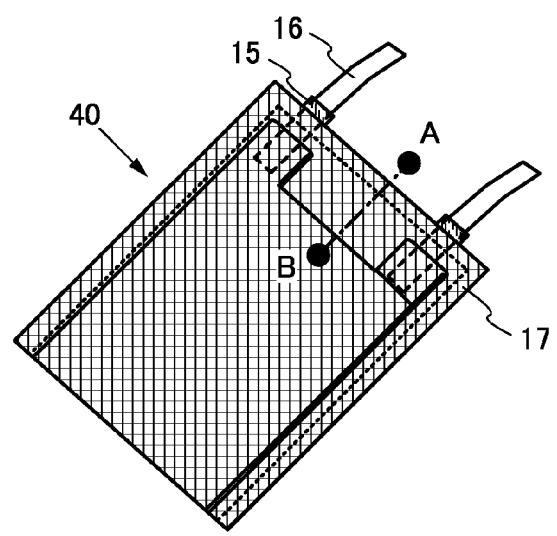

In this manner, a secondary battery 40 illustrated in FIG. 16D can be fabricated.

The film 10 serving as an exterior body of the obtained secondary battery 40 has a pattern of projections. A region between a dotted line and an edge of the film 10 in FIG. 16D is a thermocompression-bonded region 17, which also has a pattern of projections. Although the heights of projections are smaller in the thermocompression-bonded region 17 than in the center portion, the projections can reduce stress applied when the secondary battery is bent.

Figure 16E:
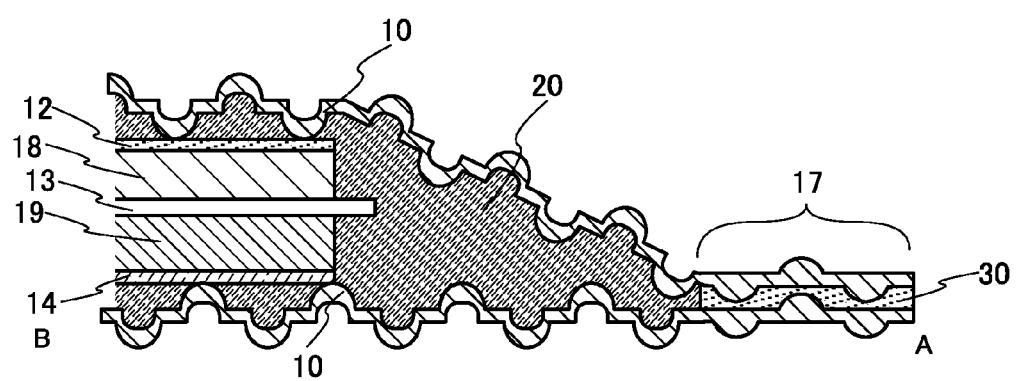

FIG. 16E illustrates an example of a cross section taken along dashed-dotted line A-B in FIG. 16D.

As illustrated in FIG. 16E, projections and depressions of the film 10 are different between a region overlapping with the positive electrode current collector 12 and the thermocompression-bonded region 17. As illustrated in FIG. 16E, the positive electrode current collector 12, a positive electrode active material layer 18, the separator 13, a negative electrode active material layer 19, and the negative electrode current collector 14 are stacked in this order and surrounded by the folded film 10. The folded film 10 is sealed by its end portions with an adhesive layer 30 and is provided with an electrolyte solution 20. In other words, the folded film 10 is filled with the electrolyte solution 20.

Examples of positive electrode active materials that can be used for the positive electrode active material layer 18 include a composite oxide with an olivine structure, a composite oxide with a layered rock-salt structure, and a composite oxide with a spinel structure. For example, a compound such as $LiFeO_2$, $LiCoO_2$, $LiNiO_2$, $LiMn_2O_4$, $V_2O_5$, $Cr_2O_5$, or $MnO_2$ can be used.

Alternatively, a composite material ($LiMPO_4$ (general formula, where M is one or more of Fe(II), Mn(II), Co(II), and Ni(II)) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Further alternatively, a composite material such as $Li_{(2-j)}MSiO_4$ (general formula, where M is one or more of Fe(II), Co(II), and Ni(II); 0≤j≤2) may be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1) $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by a general formula $A_zM_2(XO_4)_3$ (A=Li, Na, or Mg, M=Fe, Mn, Ti, V, Nb, or Al, and X=S, P, Mo, W, As, or Si) can be used as the positive electrode active material. Examples of the nasicon compound are $Fe_2(MnO_4)_3$, $Fe_2(SO_4)_3$, and $Li_3Fe_2(PO_4)_3$. Further alternatively, a compound expressed by a general formula $Li_2MPO_4F$, $Li_2MP_2O_7$, or $Li_5MO_4$ (M=Fe or Mn), a perovskite fluoride such as $NaFeF_3$ or $FeF_3$, a metal chalcogenide (a sulfide, a selenide, or a telluride) such as $TiS_2$ or $MoS_2$, an oxide with an inverse spinel structure such as $LiMVO_4$, a vanadium oxide (such as $V_2O_5$, $V_6O_{13}$, or $LiV_3O_8$), a manganese oxide, an organic sulfur compound, or the like can be used as the positive electrode active material.

In the case where carrier ions are alkali metal ions other than lithium ions or alkaline-earth metal ions, a material containing an alkali metal (e.g., sodium or potassium) or an alkaline-earth metal (e.g., calcium, strontium, barium, beryllium, or magnesium) instead of lithium may be used as the positive electrode active material.

As the separator 13, an insulator such as cellulose (paper), polyethylene with pores, and polypropylene with pores can be used.

For an electrolyte in the electrolyte solution, a material having carrier ion mobility and containing lithium ions serving as carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

For a solvent of the electrolyte solution, a material having the carrier ion mobility is used. As the solvent of the electrolyte solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, and tetrahydrofuran, and one or more of these materials can be used. When a gelled polymeric material is used for the solvent of the electrolyte solution, safety against liquid leakage and the like is improved. Furthermore, a thin and light storage battery can be fabricated. Typical examples of gelled polymeric materials include a silicone gel, an acrylic gel, an acrylonitrile gel, a polyethylene oxide-based gel, a polypropylene oxide-based gel, and a gel of a fluorine-based polymer. Alternatively, the use of one or more kinds of ionic liquids (room temperature molten salts) which have features of non-flammability and non-volatility for the solvent of the electrolyte solution can prevent the storage battery from exploding or catching fire even when the storage battery internally shorts out or the internal temperature increases because of overcharging and the like. An ionic liquid is a salt in the fluid state and has high ion mobility (conductivity). An ionic liquid contains a cation and an anion. Examples of ionic liquids include an ionic liquid containing an ethylmethylimidazolium (EMI) cation and an ionic liquid containing an N-methyl-N-propylpiperidinium ($PP_{13}$) cation.

Instead of the electrolyte solution, a solid electrolyte containing an inorganic material such as a sulfide-based inorganic material or an oxide-based inorganic material, or a solid electrolyte containing a polymeric material such as a polyethylene oxide (PEO)-based polymeric material may be used. When the solid electrolyte is used, a separator and a spacer are not necessary. Furthermore, the battery can be entirely solidified; thus, there is no possibility of liquid leakage and the safety of the battery is dramatically increased.

A material with which lithium can be dissolved and precipitated or a material into and from which lithium ions can be inserted and extracted can be used as a negative electrode active material of the negative electrode active material layer 19; for example, metallic lithium, a carbon-based material, an alloy-based material, or the like can be used.

The metallic lithium is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, fullerene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of metallic lithium (higher than or equal to 0.1 V and lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of metallic lithium.

As the negative electrode active material, an alloy-based material or an oxide which enables charge-discharge reactions by an alloying reaction and a dealloying reaction with lithium can be used. In the case where carrier ions are lithium ions, a material containing at least one of Al, Si, Ge, Sn, Pb, Sb, Bi, Ag, Au, Zn, Cd, In, Ga, and the like can be used as such an alloy-based material, for example. Such elements have higher capacity than carbon. In particular, silicon has a significantly high theoretical capacity of 4200 mAh/g. For this reason, silicon is preferably used as the negative electrode active material. Examples of the alloy-based material containing such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn.

Alternatively, as the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used. Note that SiO refers to the powder of a silicon oxide including a silicon-rich portion, and can be also referred to as $SiO_y$ (2>y>0). Examples of SiO include a material containing one or more of $Si_2O_3$, $Si_3O_4$, and $Si_2O$ and a mixture of Si powder and silicon dioxide ($SiO_2$). Note that, SiO may contain another element (e.g., carbon, nitrogen, iron, aluminum, copper, titanium, calcium, or manganese). In other words, SiO refers to a colored material containing two or more of single crystal silicon, amorphous silicon, polycrystal silicon, $Si_2O_3$, $Si_3O_4$, $Si_2O$, and $SiO_2$. Thus, SiO can be distinguished from $SiO_x$ (x≥2), which is clear and colorless or white. Note that in the case where a secondary battery is fabricated using SiO as a material thereof and the SiO is oxidized because of repeated charge and discharge cycles, SiO might be changed into $SiO_2$ in some cases.

Still alternatively, as the negative electrode active material, $Li_{(3-w)}M_wN$ (M=Co, Ni, or Cu) with a $Li_3N$ structure, which is a nitride containing lithium and a transition metal, can be used. For example, $Li_{2.6}Co_{0.4}N_3$ is preferable because of its high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for the positive electrode active material which does not contain lithium ions, such as $V_2O_5$ or $Cr_3O_8$. In the case of using the material containing lithium ions as a positive electrode active material, the nitride containing lithium and a transition metal can be used as the negative electrode active material as long as the lithium ions contained in the positive electrode active material are extracted in advance.

Alternatively, a material which causes a conversion reaction can be used as the negative electrode active material; for example, a transition metal oxide which does not cause an alloy reaction with lithium, such as cobalt oxide (CoO), nickel oxide (NiO), or iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as the positive electrode active material because of its high potential.

The negative electrode active material layer 19 may further include a binder for increasing adhesion of the active material, a conductive additive for increasing the conductivity of the negative electrode active material layer 19, and the like in addition to the above negative electrode active material.

In the secondary battery, for example, the separator 13 has a thickness of approximately 15 μm to 30 μm, the positive electrode current collector 12 has a thickness of approximately 10 μm to 40 μm, the positive electrode active material layer 18 has a thickness of approximately 50 μm to 100 μm, the negative electrode active material layer 19 has a thickness of approximately 50 μm to 100 μm, and the negative electrode current collector 14 has a thickness of approximately 5 μm to 40 μm. The film 10 has a thickness of approximately 20 μm to 500 μm. The height of each of the projections of the film 10 is approximately 10 μm to 400 μm. If the height of each of the projections of the film 10 is 2 mm or more, the total thickness of the secondary battery becomes too large.

The battery capacity per unit volume is preferably as large as possible. The battery capacity per unit volume becomes large as the proportion of the volume of a battery portion to the total volume of the secondary battery increases. When the heights of the projections of the film 10 are made large, the total thickness of the secondary battery is increased and the proportion of the volume of the battery portion to the total volume is decreased, resulting in a small battery capacity.

The adhesive layer 30, which is only partly illustrated in FIG. 16E, is formed in the following manner: a layer made of polypropylene is provided on the entire surface of the layer on the side where the film is attached, and only a thermocompression-bonded portion becomes the adhesive layer 30.

FIG. 16E illustrates an example where the bottom side of the film 10 is fixed and pressure bonding is performed. In this case, the top side is greatly bent and a step is formed. Thus, when a plurality of the above-described stacks (e.g., eight or more stacks) are provided in the folded film 10, the step is large and stress applied to the top side of the film 10 might be too high. Furthermore, an edge of the top side of the film might be misaligned with an edge of the bottom side of the film. To prevent misalignment of the edges, a step may be provided on the bottom side of the film and pressure bonding may be performed at a center portion so that stress is uniformly applied.

In the case where the misalignment is large, there is a region where part of the edge of one film does not overlap with the other film. To correct the misalignment of the edges of the top and bottom sides of the film, such a region may be cut off.

Here, a current flow in charging a secondary battery is described with reference to FIG. 17. When a secondary battery using lithium is regarded as a closed circuit, lithium ions transfer and a current flows in the same direction. Note that in the secondary battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" or a "plus electrode" and the negative electrode is referred to as a "negative electrode" or a "minus electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive (plus) electrode or a negative (minus) electrode.

Figure 17:
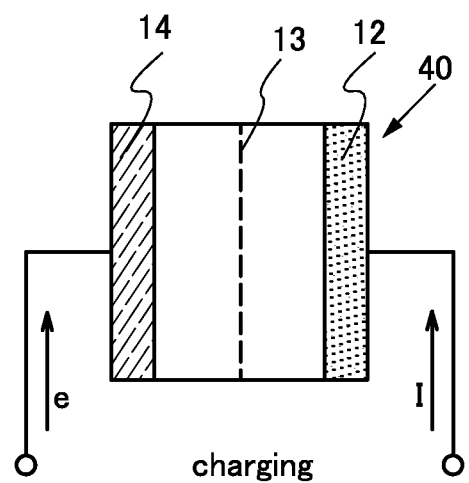
FIG. 17 illustrates one embodiment of the present invention.

Two terminals in FIG. 17 are connected to a charger, and the secondary battery 40 is charged. As the charge of the secondary battery 40 proceeds, a potential difference between electrodes increases. In FIG. 17, electrons flow from one terminal outside the secondary battery 40 to the positive electrode current collector 12; thus, current flows from the positive electrode current collector 12 to the negative electrode current collector 14 in the secondary battery 40. The positive direction in FIG. 17 is the direction of the current that flows from the negative electrode to the other terminal outside the secondary battery 40. In other words, a current flows in the direction of a flow of a charging current.

In an example in this embodiment, one rectangle film is folded in half and two end portions are made to overlap with each other for sealing. However, the shape of the film is not limited to a rectangle and can be a polygon such as a triangle, a square, or a pentagon or any symmetric shape other than a rectangle, such as a circle or a star.

Although an example of a small battery used in a portable information terminal or the like is described in this embodiment, one embodiment of the present invention is not particularly limited to this example. Application to a large battery provided in a vehicle or the like is also possible.

Although an example of application to a lithium-ion secondary battery is described in this embodiment, one embodiment of the present invention is not limited to this example. Application to a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, and an air battery is also possible. Application to a variety of power storage devices such as a primary battery, a capacitor, and a lithium-ion capacitor is also possible. Furthermore, application to a solar cell, an optical sensor, a touch sensor, a display device, a flexible printed circuit (FPC), an optical film (e.g., a polarizing plate, a retardation plate, a prism sheet, a light reflective sheet, and a light diffusion sheet), and the like is possible.

(Embodiment 2)

In this embodiment, examples where a plurality of stacks that are partly different from the stack described in Embodiment 1 are packed in the folded film 10 will be described.

The stacks in this embodiment may be provided between the embossed film described in Embodiment 1 and a non-embossed film.

Figure 18A:
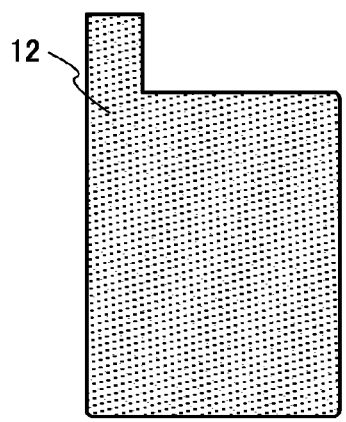
FIGS. 18A to 18E are top views illustrating one embodiment of the present invention.
Figure 18D:
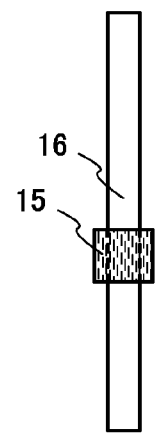
Figure 18B:
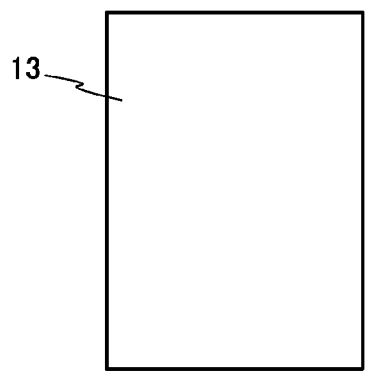

FIG. 18A is a top view of the positive electrode current collector 12. FIG. 18B is a top view of the separator 13. FIG.

Figure 18E:
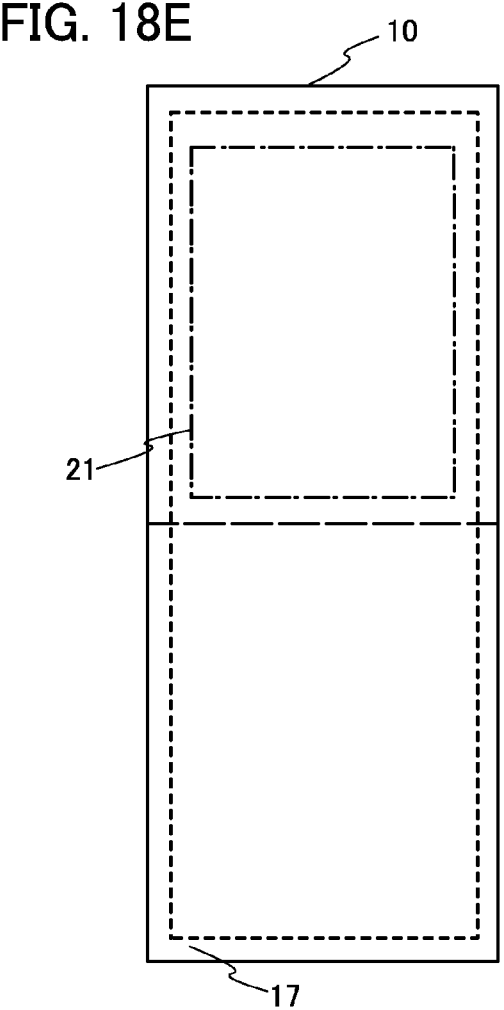
Figure 18C:
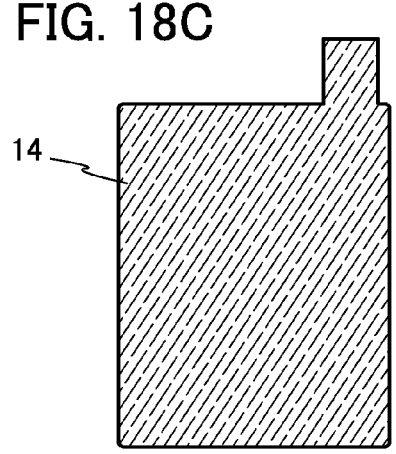

18C is a top view of the negative electrode current collector 14. FIG. 18D is a top view of the sealing layer 15 and the lead electrode 16. FIG. 18E is a top view of the film 10.

The dimensions of the components are substantially the same in FIGS. 18A to 18E. A region 21 surrounded by a dashed-dotted line in FIG. 18E has substantially the same dimensions as the separator in FIG. 18B. A region between a dashed line in FIG. 18E and an edge is the thermocompression-bonded region 17.

Figure 19A:
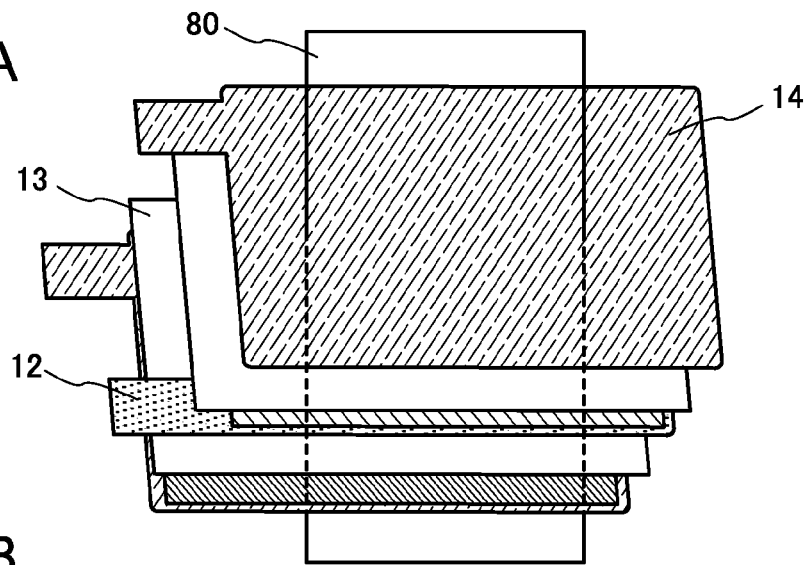
FIGS. 19A to 19C are perspective views and a cross-sectional view each illustrating one embodiment of the present invention.
Figure 19B:
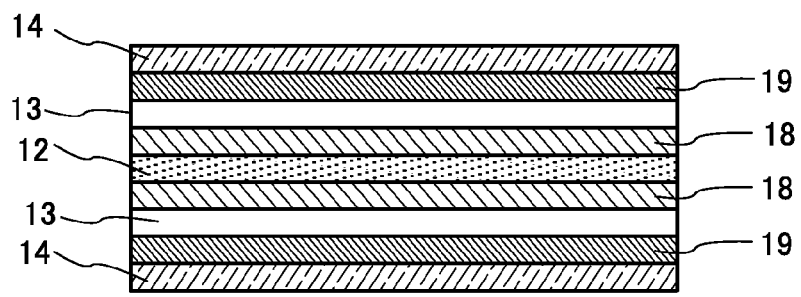

FIG. 19A illustrates an example where the positive electrode active material layer 18 is provided on both surfaces of the positive electrode current collector 12. Specifically, the negative electrode current collector 14, the negative electrode active material layer 19, the separator 13, the positive electrode active material layer 18, another positive electrode current collector 12, another positive electrode active material layer 18, the separator 13, another negative electrode active material layer 19, and another negative electrode current collector 14 are stacked in this order. FIG. 19B is a cross-sectional view of the stacked-layer structure taken along a plane 80.

Note that although FIG. 19A illustrates an example where two separators are used, the following structure may be employed: one separator is folded and two end portions are sealed to form a bag, and the positive electrode current collector 12 is provided in the bag. The positive electrode active material layer 18 is formed on both surfaces of the positive electrode current collector 12 provided in the bag-like separator.

Figure 19C:
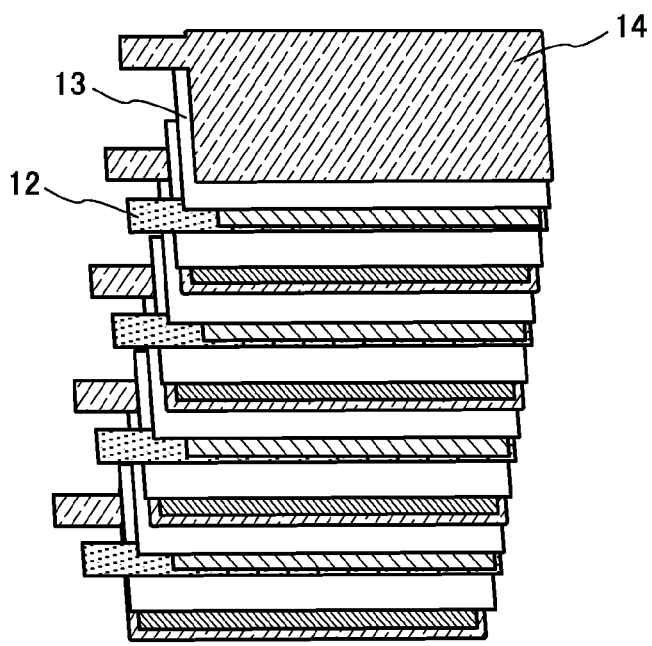

The negative electrode active material layer 19 may be provided on both surfaces of the negative electrode current collector 14. In a secondary battery illustrated in FIG. 19C, three negative electrode current collectors 14 each having the negative electrode active material layer 19 on both surfaces, four positive electrode current collectors 12 each having the positive electrode active material layer 18 on both surfaces, and eight separators 13 are sandwiched between two negative electrode current collectors 14 each having the negative electrode active material layer 19 on one surface. In this case, four bag-like separators can be used instead of eight separators.

The capacity of the secondary battery can be increased by increasing the number of the stacks. In addition, when the positive electrode active material layer 18 is provided on both surfaces of the positive electrode current collector 12 and the negative electrode active material layer 19 is provided on both surfaces of the negative electrode current collector 14, the thickness of the secondary battery can be made small.

Figure 20A:
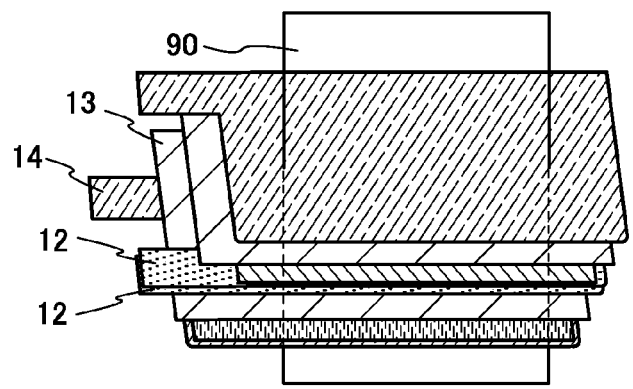
FIGS. 20A to 20C are perspective views and a cross-sectional view each illustrating one embodiment of the present invention.
Figure 20B:
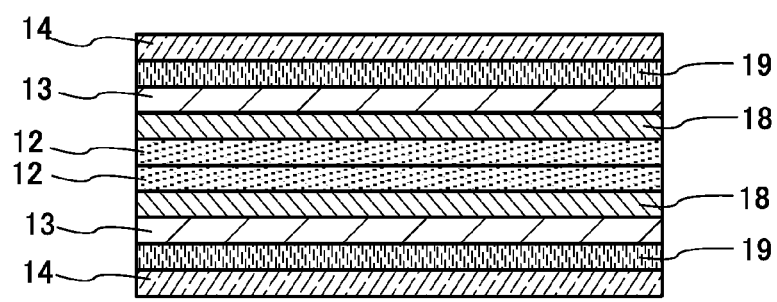

FIG. 20A illustrates a secondary battery in which the positive electrode active material layer 18 is provided on one surface of the positive electrode current collector 12 and the negative electrode active material layer 19 is provided on one surface of the negative electrode current collector 14. Specifically, the negative electrode active material layer 19 is provided on one surface of the negative electrode current collector 14 and the separator 13 is stacked on and in contact with the negative electrode active material layer 19. On a surface of the separator 13 remote from the negative electrode active material layer 19, the positive electrode active material layer 18 that is provided on one surface of the positive electrode current collector 12 is provided. On the other surface of the positive electrode current collector 12, another positive electrode current collector 12 whose one surface is provided with the positive electrode active material layer 18 is provided. Note that the positive electrode current collectors 12 are provided such that the surfaces remote from the positive electrode active material layers 18 face each other. Another separator 13 is stacked thereon, and another negative electrode active material layer 19 provided on one surface of another negative electrode current collector 14 is stacked on and in contact with the separator. FIG. 20B is a cross-sectional view of the stacked-layer structure in FIG. 20A, taken along a plane 90.

Although two separators are used in FIG. 20A, the following structure may be employed: one separator is folded and two end portions are sealed to form a bag, and two positive electrode current collectors 12 in each of which one surface is provided with the positive electrode active material layer 18 are provided in the bag.

Figure 20C:
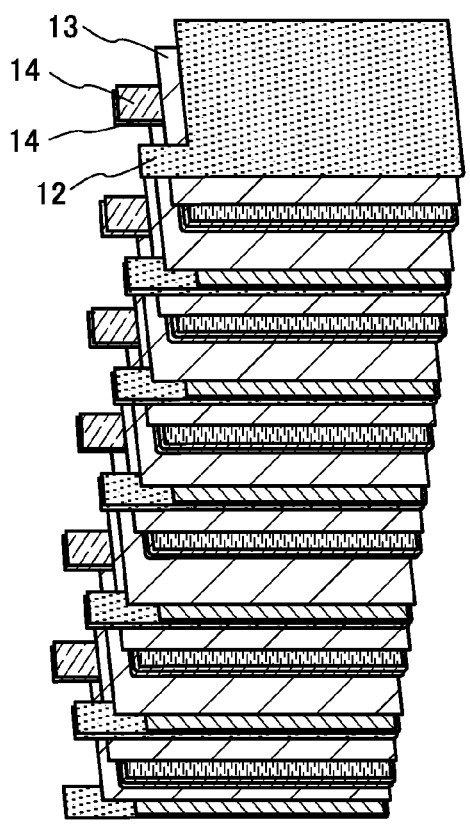
Figure 21A:
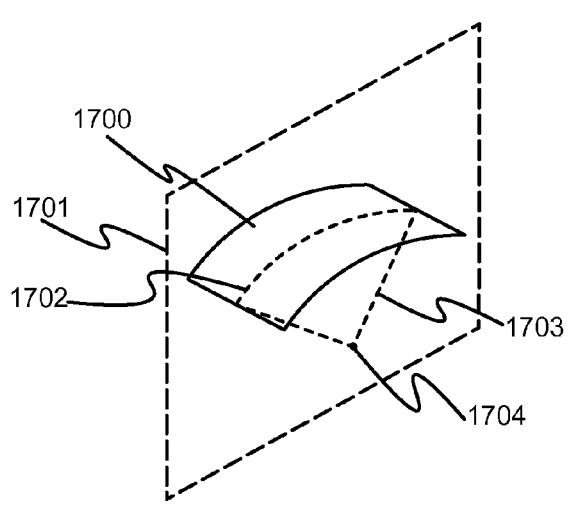
FIGS. 21A to 21C illustrate a radius of curvature of a surface.
Figure 21B:
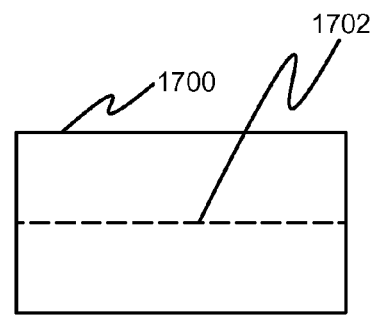
Figure 21C:
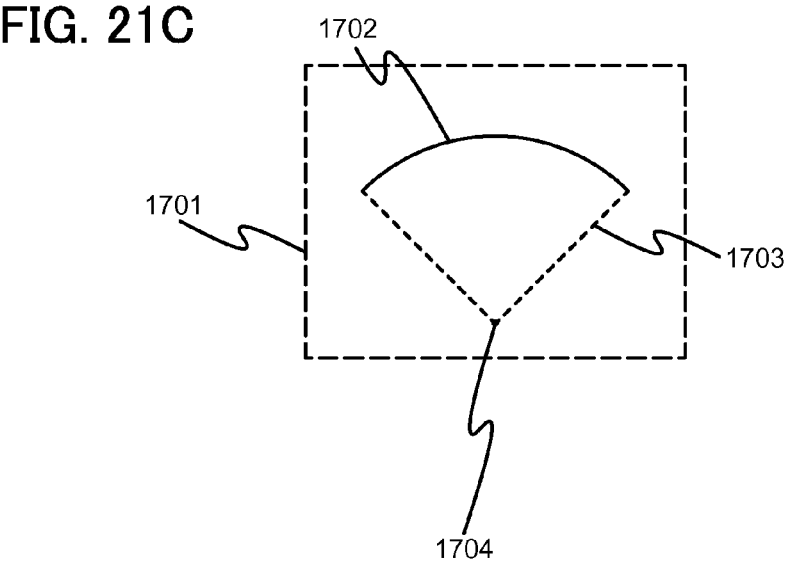
Figure 22A:
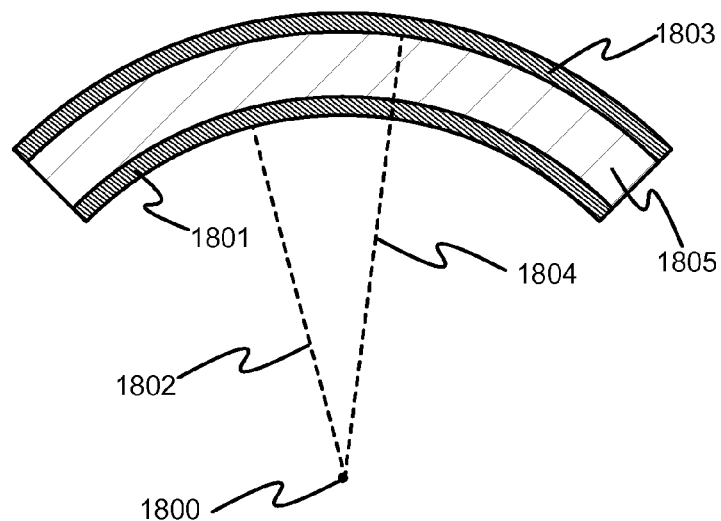
Figure 22B:
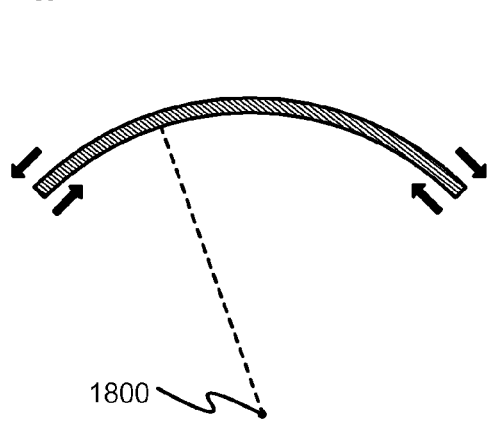
Figure 22C:
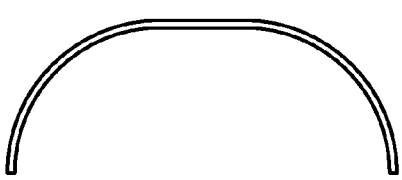

In FIG. 20C, a plurality of the stacks illustrated in FIG. 20A are stacked. In FIG. 20C, the negative electrode current collectors 14 are provided such that the surfaces remote from the negative electrode active material layers 19 face each other. In FIG. 20C, twelve positive electrode current collectors 12, twelve negative electrode current collectors 14, and twelve separators 13 are stacked.

A secondary battery with a structure in which the positive electrode active material layer 18 is provided on one surface of the positive electrode current collector 12 and the negative electrode active material layer 19 is provided on one surface of the negative electrode current collector 14, is thicker than a secondary battery with a structure in which the positive electrode active material layer 18 is provided on both surfaces of the positive electrode current collector 12 and the negative electrode active material layer 19 is provided on both surfaces of the negative electrode current collector 14. However, the surface of the positive electrode current collector 12 on which the positive electrode active material layer 18 is not provided faces the surface of another positive electrode current collector 12 on which the positive electrode active material layer 18 is not provided; as a result, metals are in contact with each other. Similarly, the surface of the negative electrode current collector 14 on which the negative electrode active material layer 19 is not provided faces the surface of another negative electrode current collector 14 on which the negative electrode active material layer 19 is not provided; as a result, metals are in contact with each other. Surfaces where the metals are in contact with each other easily slide on each other owing to the low friction. Since the metals in the secondary battery slide on each other at the time of bending, the secondary battery is easily bent.

The protruding portions of the positive electrode current collector 12 and the negative electrode current collector 14 are also referred to as tab portions. The tab portions of the positive electrode current collector 12 and the negative electrode current collector 14 are easily cut when the secondary battery is bent. This is because the tab portions are long and narrow protrusions and the stress is likely to be applied to the roots of the tab portions.

In the structure in which the positive electrode active material layer 18 is provided on one surface of the positive electrode current collector 12 and the negative electrode active material layer 19 is provided on one surface of the negative electrode current collector 14, there are a surface where the positive electrode current collectors 12 are in contact with each other and a surface where the negative electrode current collectors 14 are in contact with each other. The surface where the current collectors are in contact with each other has low friction resistance and thus easily reduces the stress due to the difference in radius of curvature that occurs when the battery is changed in shape. Furthermore, the total thickness of the tab portion is large in the structure in which the positive electrode active material layer 18 is provided on one surface of the positive electrode current collector 12 and the negative electrode active material layer 19 is provided on one surface of the negative electrode current collector 14; thus, the stress is distributed as compared with the case of the structure in which the positive electrode active material layer 18 is provided on both surfaces of the positive electrode current collector 12 and the negative electrode active material layer 19 is provided on both surfaces of the negative electrode current collector 14. As a result, the tab portion is less likely to be cut.

In the case of thus stacking layers, ultrasonic welding is performed to fix and electrically connect all the positive electrode current collectors 12 at a time. Furthermore, when ultrasonic welding is performed with the positive electrode current collectors 12 overlapping with a lead electrode, they can be electrically connected efficiently.

Ultrasonic welding can be performed in such a manner that ultrasonic waves are applied to the tab portion of the positive electrode current collector placed so as to overlap with a tab portion of another positive electrode current collector, while pressure is applied thereto.

(Embodiment 3)

In this embodiment, examples of electronic devices incorporating the lithium-ion secondary battery described in Embodiment 1 or 2 will be described.

The secondary battery that can be fabricated according to Embodiment 1 or 2 includes a thin and flexible film as an exterior body and thus can change its form.

Examples of electronic devices including flexible secondary batteries are as follows: display devices such as head-mounted displays and goggle type displays; televisions (also referred to as television receivers); desktop personal computers; notebook personal computers; monitors for computers or the like; digital cameras; digital video cameras; digital photo frames; electronic organizers; e-book readers; electronic translators; toys; audio input devices such as microphones; electric shavers; electric toothbrushes; high-frequency heating appliances such as microwave ovens; electric rice cookers; electric washing machines; electric vacuum cleaners; water heaters; electric fans; hair dryers; air-conditioning systems such as humidifiers, dehumidifiers, and air conditioners; dishwashers; dish dryers; clothes dryers; futon dryers; electric refrigerators; electric freezers; electric refrigerator-freezers; freezers for preserving DNA; flashlights; electric power tools; alarm devices such as smoke detectors, gas alarm devices, and security alarm devices; industrial robots; health equipment and medical equipment such as hearing aids, cardiac pacemakers, X-ray equipment, radiation counters, electric massagers, and dialyzers; mobile phones (also referred to as mobile phone devices or cell phones); portable game machines; portable information terminals; lighting devices; headphones; stereos; remote controllers; clocks such as table clocks and wall clocks; cordless phone handsets; transceivers; pedometers; calculators; portable or stationary music reproduction devices such as digital audio players; and large game machines such as pachinko machines.

In addition, a flexible secondary battery can be incorporated along a curved inside/outside wall surface of a house or a building or a curved interior/exterior surface of an automobile.

FIG. 23A illustrates an example of a mobile phone. A mobile phone 7400 includes a display portion 7402 incorporated in a housing 7401, an operation button 7403, an external connection port 7404, a speaker 7405, a microphone 7406, and the like. Note that the mobile phone 7400 includes a secondary battery 7407.

FIG. 23B illustrates the mobile phone 7400 that is curved. When the whole mobile phone 7400 is curved by external force, the secondary battery 7407 included in the mobile phone 7400 is also curved. FIG. 23C illustrates the curved secondary battery 7407. The secondary battery 7407 is a laminated storage battery (also referred to as a layered battery or a film-covered battery). The secondary battery 7407 is curved and fixed. Note that the secondary battery 7407 includes a lead electrode 7408 electrically connected to a current collector 7409. A film serving as an exterior body of the secondary battery 7407 is embossed, so that the secondary battery 7407 has high reliability even when curved, for example. The mobile phone 7400 may also be provided with a slot for insertion of a SIM card, a connector portion for connecting a USB device such as a USB memory, or the like.

FIG. 23D illustrates an example of a mobile phone that can be bent. When curved to be put around a forearm, the mobile phone can be used as a bangle-type mobile phone as in FIG. 23E. A mobile phone 7100 includes a housing 7101, a display portion 7102, an operation button 7103, and a secondary battery 7104. FIG. 23F illustrates the curved secondary battery 7104. When the curved secondary battery 7104 is on a user's arm, the housing changes its form and the curvature of a part or the whole of the secondary battery 7104 is changed. Specifically, a part or the whole of the housing or the main surface of the secondary battery 7104 is changed in the range of radius of curvature from 10 mm to 150 mm. Note that the secondary battery 7104 includes a lead electrode 7105 that is electrically connected to a current collector 7106. Pressing is performed to form a plurality of projections and depressions on a surface of a film serving as the exterior body of the secondary battery 7104, for example; thus, reliability is retained even when the secondary battery 7104 is curved many times with different curvatures. The mobile phone 7100 may also be provided with a slot for insertion of a SIM card, a connector portion for connecting a USB device such as a USB memory, or the like. The mobile phone illustrated in FIG. 23D bent at a center portion can be in a form illustrated in FIG. 23G. When a center portion of the mobile phone is folded so that edges of the mobile phone overlap with each other as illustrated in FIG. 23H, the mobile phone can be compact so as to be put in, a pocket of clothes a user wears, for example. As described above, the mobile phone illustrated in FIG. 23D can change its form in more than one way, and it is desirable that at least the housing 7101, the display portion 7102, and the secondary battery 7104 have flexibility in order to change the form of the mobile phone.

Figure 24A:
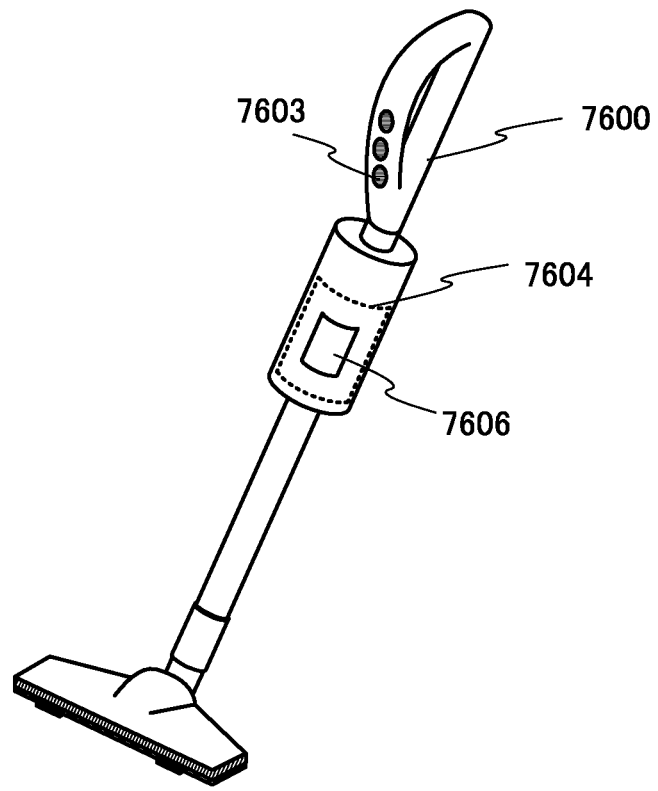
FIGS. 24A to 24C illustrate an electronic device.

FIG. 24A illustrates an example of a vacuum cleaner. By being provided with a secondary battery, the vacuum cleaner can be cordless. To secure a dust collecting space for storing vacuumed dust inside the vacuum cleaner, a space occupied by a secondary battery 7604 is preferably as small as possible. For this reason, it is useful to provide the thin secondary battery 7604 that can be bent, between the outside surface and the dust collecting space.

Figure 24B:
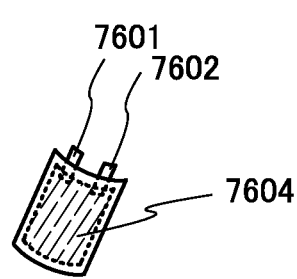

The vacuum cleaner 7600 is provided with an operation button 7603 and the secondary battery 7604. FIG. 24B illustrates the secondary battery 7604 that is curved. A film serving as an exterior body of the secondary battery 7604 is embossed, so that the secondary battery 7604 has high reliability even when curved. The secondary battery 7604 includes a lead electrode 7601 electrically connected to a negative electrode and a lead electrode 7602 electrically connected to a positive electrode.

Figure 24C:
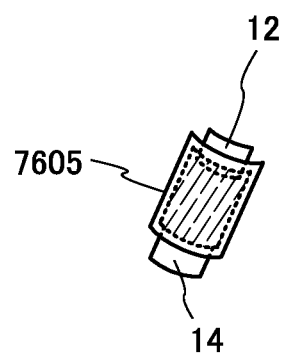

As an example of a secondary battery where one current collector is exposed from each short side of an exterior body, a curved secondary battery 7605 is illustrated in FIG. 24C. In the secondary battery 7605 illustrated in FIG. 24C, part of the positive electrode current collector 12 is exposed from one short side of the exterior body and part of the negative electrode current collector 14 is exposed from the other short side of the exterior body. A film serving as the exterior body of the secondary battery 7605 is also embossed, so that the secondary battery 7605 can be bent and has high reliability. Note that a structure in which one lead electrode is exposed from one short side of an exterior body may be employed.

The thin secondary battery 7604 can be fabricated by the method for fabricating a laminated secondary battery that is described in Embodiment 1 or 2.

The thin secondary battery 7604 has a laminated structure and is curved and fixed. The vacuum cleaner 7600 includes a display portion 7606 that displays, for example, the remaining amount of power in the thin secondary battery 7604. A display area of the display portion 7606 is curved to fit the shape of the outer surface of the vacuum cleaner. The vacuum cleaner includes a connection cord for being connected to a receptacle. When the thin secondary battery 7604 is charged to have sufficient power, the connection cord can be removed from the receptacle to use the vacuum cleaner. The thin secondary battery 7604 may be charged wirelessly without using the connection cord.

The use of secondary batteries that can be bent in vehicles enables production of next-generation clean energy vehicles such as hybrid electric vehicles (HEVs), electric vehicles (EVs), and plug-in hybrid electric vehicles (PHEVs). Moreover, secondary batteries that can be bent can also be used in moving objects such as agricultural machines, motorized bicycles including motor-assisted bicycles, motorcycles, electric wheelchairs, electric carts, boats or ships, submarines, aircrafts such as fixed-wing aircrafts and rotary-wing aircrafts, rockets, artificial satellites, space probes, planetary probes, and spacecrafts.

Figure 25A:
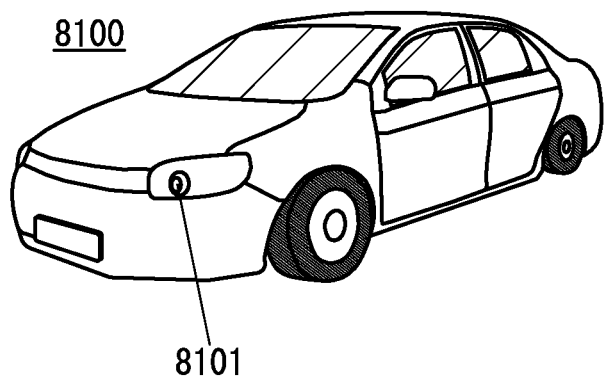
FIGS. 25A and 25B each illustrate a vehicle including a secondary battery.
Figure 25B:
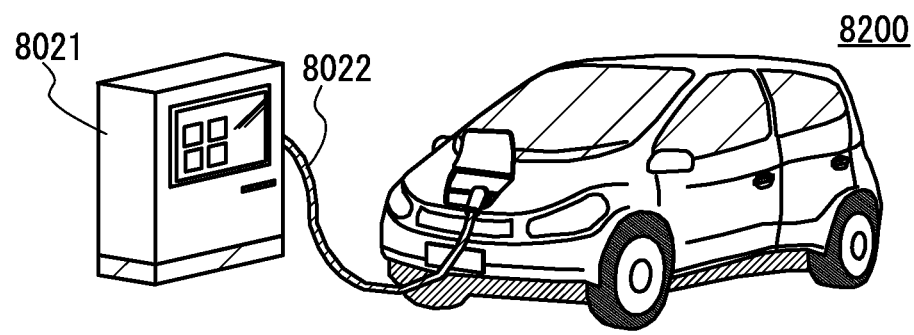

FIGS. 25A and 25B each illustrate an example of a vehicle fabricated using one embodiment of the present invention. An automobile 8100 illustrated in FIG. 25A is an electric vehicle that runs on the power of an electric motor. Alternatively, the automobile 8100 is a hybrid electric vehicle capable of driving using either an electric motor or an engine as appropriate. In the case of providing a laminated secondary battery in the vehicle, a battery module including a plurality of laminated secondary batteries is placed in one place or more than one place. One embodiment of the present invention can make a secondary battery itself compact and lightweight; thus, when the secondary battery having a curved surface is provided on the inside of a tire of a vehicle, for example, the vehicle can be a high-mileage vehicle. Furthermore, a secondary battery that can have various shapes can be provided in a small space in a vehicle, which allows a space in a trunk and a space for riders to be secured. The automobile 8100 includes the secondary battery. The secondary battery is used not only to drive the electric motor, but also to supply electric power to a light-emitting device such as a headlight 8101 or a room light (not illustrated).

The secondary battery can also supply electric power to a display device of a speedometer, a tachometer, or the like included in the automobile 8100. Furthermore, the secondary battery can supply electric power to a semiconductor device included in the automobile 8100, such as a navigation system.

FIG. 25B illustrates an automobile 8200 including the secondary battery. The automobile 8200 can be charged when the secondary battery is supplied with electric power through external charging equipment by a plug-in system, a contactless power feeding system, or the like. In FIG. 25B, the secondary battery included in the automobile 8200 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. With the use of a plug-in technique, the secondary battery included in the automobile 8200 can be charged by being supplied with electric power from outside, for example. The charging can be performed by converting AC electric power into DC electric power through a converter such as an AC-DC converter.

Although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle stops but also when moves. In addition, the contactless power feeding system may be utilized to perform transmission and reception of electric power between two vehicles. A solar cell may be provided in the exterior of the automobile to charge the secondary battery when the automobile stops or moves. To supply electric power in such a contactless manner, an electromagnetic induction method or a magnetic resonance method can be used.

According to one embodiment of the present invention, the degree of flexibility in place where the secondary battery can be provided is increased; thus, a vehicle can be designed efficiently. Furthermore, according to one embodiment of the present invention, the secondary battery itself can be made compact and lightweight as a result of improved characteristics of the secondary battery. The compact and lightweight secondary battery contributes to a reduction in the weight of a vehicle, and thus increases the driving radius. Furthermore, the secondary battery included in the vehicle can be used as a power source for supplying electric power to products other than the vehicle. In such a case, the use of a commercial power source at peak time of electric power demand can be avoided.

This embodiment can be freely combined with Embodiment 1 or 2.

Note that content (or may be part of the content) described in this embodiment may be applied to, combined with, or replaced by different content (or may be part of the different content) described in the embodiment and/or content (or may be part of the content) described in one or more different embodiments.

In each embodiment, a content described in the embodiment is a content described with reference to a variety of diagrams or a content described with a text described in this specification.

Note that by combining a diagram (or may be part of the diagram) illustrated in one embodiment with another part of the diagram, a different diagram (or may be part of the different diagram) illustrated in the embodiment, and/or a diagram (or may be part of the diagram) illustrated in another embodiment or other embodiments, much more diagrams can be formed.

This application is based on Japanese Patent Application serial no. 2014-162785 filed with Japan Patent Office on Aug. 8, 2014, the entire contents of which are hereby incorporated by reference.

What is claimed is:

1. A secondary battery comprising:
a film comprising a first region and a second region,
wherein the first region overlaps a positive electrode current collector,
wherein the second region is a thermocompression-bonded region,
wherein the first region comprises first projections on a first surface with depressed portions on a second surface,
wherein the second region comprises second projections on the first surface, and
wherein heights of the second projections are smaller than heights of the first projections.

2. The secondary battery according to claim 1,
wherein a film thickness of a top portion of each of the first projections is 1.5 or more times as large as a film thickness of a bottom portion of each of the first projections.

3. The secondary battery according to claim 1,
wherein the first projections are arranged regularly.

4. The secondary battery according to claim 1,
wherein the first projections are arranged randomly.

5. The secondary battery according to claim 1,
wherein the film comprises a metal film and an insulating film, and
wherein the metal film is in contact with the insulating film.

6. The secondary battery according to claim 1,
wherein the positive electrode current collector is surrounded by the film.

7. An electronic device comprising:
the secondary battery according to claim 1; and
a display device, a microphone, a speaker, an operation button, a housing, or a sensor.

8. A vehicle comprising:
the secondary battery according to claim 1; and
a display device of a speedometer.

9. A secondary battery comprising:
a film comprising a first region and a second region,
wherein the first region overlaps a positive electrode current collector,
wherein the second region is a thermocompression-bonded region,
wherein the first region comprises first projections on a first surface with first depressed portions on a second surface, and second projections on the second surface with second depressed portions on the first surface,
wherein the second region comprises third projections on the first surface, and
wherein heights of the third projections are smaller than heights of the first projections.

10. The secondary battery according to claim 9,
wherein a film thickness of a first top portion of each of the first projections is 1.5 or more times as large as a film thickness of a first bottom portion of each of the first projections, and
wherein a film thickness of a second top portion of each of the first projections is 1.5 or more times as large as a film thickness of a second bottom portion of each of the first projections.

11. The secondary battery according to claim 9,
wherein the first projections and the second projections are arranged regularly.

12. The secondary battery according to claim 9,
wherein the first projections and the second projections are arranged randomly.

13. The secondary battery according to claim 9,
wherein the film thickness of a first top portion of each of the first projections is different from the film thickness of a second top portion of each of the first projections.

14. The secondary battery according to claim 9,
wherein the film thickness of a first top portion of each of the first projections is the same as the film thickness of a second top portion of each of the first projections.

15. The secondary battery according to claim 9,
wherein the first projections are arranged in a first direction,
wherein the second projections are arranged in a second direction, and
wherein the first direction and the second direction intersect each other.

16. The secondary battery according to claim 9,
wherein the first projections are arranged in a first direction,
wherein the second projections are arranged in a second direction, and
wherein the first direction and the second direction are parallel to each other.

17. The secondary battery according to claim 9,
wherein the film comprises a metal film and an insulating film, and
wherein the metal film is in contact with the insulating film.

18. The secondary battery according to claim 9,
wherein the positive electrode current collector is surrounded by the film.

19. An electronic device comprising:
the secondary battery according to claim 9; and
a display device, a microphone, a speaker, an operation button, a housing, or a sensor.

20. A vehicle comprising:
the secondary battery according to claim 9; and
a display device of a speedometer.

* * * * *